(12) United States Patent
Suzuki et al.

(10) Patent No.: US 8,257,865 B2
(45) Date of Patent: Sep. 4, 2012

(54) ELECTRODE ACTIVE MATERIAL, ELECTRODE, LITHIUM-ION SECONDARY BATTERY, METHOD OF MAKING ELECTRODE ACTIVE MATERIAL, AND METHOD OF MAKING LITHIUM-ION SECONDARY BATTERY

(75) Inventors: Tadashi Suzuki, Tokyo (JP); Kazuya Ogawa, Tokyo (JP); Tsuyoshi Iijima, Tokyo (JP); Satoshi Maruyama, Tokyo (JP)

(73) Assignee: TDK Corporation, Tokyo (JP)

( * ) Notice: Subject to any disclaimer, the term of this patent is extended or adjusted under 35 U.S.C. 154(b) by 269 days.

(21) Appl. No.: 12/222,360

(22) Filed: Aug. 7, 2008

(65) Prior Publication Data

US 2008/0314482 A1    Dec. 25, 2008

Related U.S. Application Data

(62) Division of application No. 10/466,614, filed as application No. PCT/JP02/12134 on Nov. 20, 2002, now abandoned.

(30) Foreign Application Priority Data

| Nov. 20, 2001 | (JP) | 2001-355253 |
| Jan. 17, 2002 | (JP) | 2002-008684 |
| Jun. 28, 2002 | (JP) | 2002-191503 |
| Jun. 28, 2002 | (JP) | 2002-191504 |
| Jul. 30, 2002 | (JP) | 2002-221287 |

(51) Int. Cl.
*H01M 10/44* (2006.01)
*H01M 4/13* (2010.01)
*H02J 7/00* (2006.01)

(52) U.S. Cl. .......... 429/223; 429/209; 429/224; 429/50; 429/52; 320/137

(58) Field of Classification Search .................. None
See application file for complete search history.

(56) References Cited

U.S. PATENT DOCUMENTS 5,264,201 A    11/1993   Dahn et al.
5,750,282 A *  5/1998   Chi et al. .................. 429/49

(Continued)

FOREIGN PATENT DOCUMENTS

JP         A-4-106875        4/1992

(Continued)

OTHER PUBLICATIONS

Ohzuku, Layered Lithium Insertion Material of LiCo1/3Ni1/3Mn1/3O2 for Lithium-Ion Batteries, Chemistry Letters 2001, the Chemical Society of Japan, pp. 642-643, CL-010390.*

(Continued)

*Primary Examiner* — Cynthia Lee
(74) *Attorney, Agent, or Firm* — Oliff & Berridge, PLC

(57) ABSTRACT

The positive electrode active material in accordance with the present invention is used for a positive electrode for a lithium-ion secondary battery, includes Li, Mn, Ni, Co, and O atoms, and has a substantially halite type crystal structure. Specifically, it is preferably expressed by $Li_aMn_bNi_cCo_dO_e$, where a is 0.85 to 1.1, b is 0.2 to 0.6, c is 0.2 to 0.6, d is 0.1 to 0.5, and e is 1 to 2 (the sum of b, c, and d being 1). Because of such composition and crystal structure, the positive electrode active material of the present invention reduces the amount of elution of the battery into the liquid electrolyte and enhances the stability at a high temperature.

2 Claims, 4 Drawing Sheets

U.S. PATENT DOCUMENTS

| | | | |
|---|---|---|---|
| 6,033,809 A | 3/2000 | Hamamoto et al. | |
| 6,165,647 A * | 12/2000 | Watanabe et al. | 429/324 |
| 6,749,648 B1 | 6/2004 | Kumar et al. | |
| 2001/0036577 A1 | 11/2001 | Nakane et al. | |
| 2002/0081495 A1 | 6/2002 | Nakajima et al. | |

FOREIGN PATENT DOCUMENTS

| | | |
|---|---|---|
| JP | A-4-267053 | 9/1992 |
| JP | A-4-300158 | 10/1992 |
| JP | A-07-045304 | 2/1995 |
| JP | A-8-37007 | 2/1996 |
| JP | A-10-214626 | 8/1998 |
| JP | A-11-250932 | 9/1999 |
| JP | A-11-273732 | 10/1999 |
| JP | A-2000-235868 | 8/2000 |
| JP | A-2000-304993 | 11/2000 |
| JP | A-2000-323171 | 11/2000 |
| JP | A-2000-35325 | 12/2000 |
| JP | A-2000-353497 | 12/2000 |
| JP | A-2001-93580 | 4/2001 |
| JP | A-2001-126765 | 5/2001 |
| JP | A-2001-243952 | 9/2001 |
| JP | A-2001-256975 | 9/2001 |
| JP | A-2001-291517 | 10/2001 |
| JP | B2-3244314 | 10/2001 |
| JP | A-2001-307684 | 11/2001 |
| JP | A--2002-100356 | 4/2002 |
| JP | A-2002-124261 | 4/2002 |
| JP | A-2002-145623 | 5/2002 |

* cited by examiner

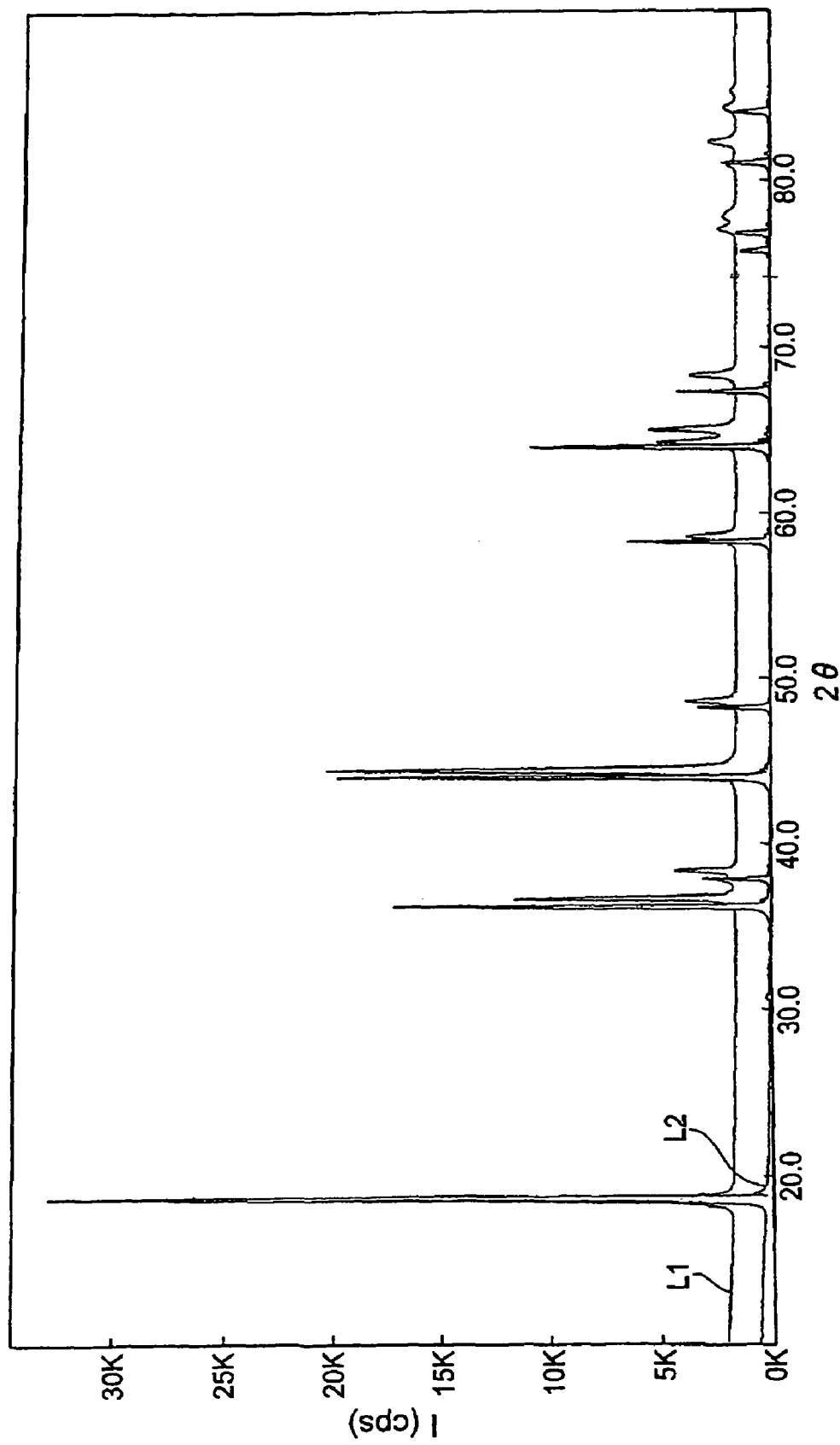

ELECTRODE ACTIVE MATERIAL, ELECTRODE, LITHIUM-ION SECONDARY BATTERY, METHOD OF MAKING ELECTRODE ACTIVE MATERIAL, AND METHOD OF MAKING LITHIUM-ION SECONDARY BATTERY

This is a Division of application Ser. No. 10/466,614 filed Jul. 18, 2003, which in turn is a National Phase of Application No. PCT/JP02/12134 filed Nov. 20, 2002. The disclosure of the prior applications is hereby incorporated by reference herein in its entirety.

TECHNICAL FIELD

The present invention relates to an electrode active material, an electrode, a lithium-ion secondary battery (a lithium-ion rechargeable battery), a method of making an electrode active material, and a method of making a lithium-ion secondary battery.

BACKGROUND ART

Lithium-ion secondary batteries are batteries with high output, so that they have come into wide use as power supplies not only for portable terminal devices, mobile communication apparatus, and the like, but also for electric cars, hybrid cars, and the like. More than 10 years have already passed since lithium-ion secondary batteries hit the market, and various attempts have been proposed to improve their characteristics. In general, a lithium-ion secondary battery comprises an electrode active material adapted to occlude and release lithium ions, positive and negative electrodes, and a liquid electrolyte, whereas various substances are used as the electrode active material.

In particular, as a positive electrode active material used for the positive electrode, lithium-containing transient metal oxides are used in general. A typical example is lithium cobalt oxide ($LiCoO_2$), where as Japanese Patent Application Laid-Open No. HEI 4-300158, Japanese Patent Application Laid-Open No. HEI 4-106875, Japanese Patent Application Laid-Open No. HEI 4-267053, and U.S. Pat. No. 5,264,201, for example, disclose LiMnNiCo type complex oxides as a multiple metal oxide including a plurality of kinds of transient metal elements.

DISCLOSURE OF THE INVENTION

Though emphasis has been laid on higher capacity and higher safety as technical problems concerning lithium-ion secondary batteries, various other test items are necessary for bringing lithium-ion secondary batteries into practical use. For responding to the elongation of usable time per recharging of a mobile terminal or the like and the diversification of environments in use, the inventors are aware that the increase in recovery capacity after high-temperature storage is one of particularly important problems in battery characteristics thereof. Normally, for evaluating the recovery capacity of a battery after high-temperature storage, the capacity of the battery is measured after it is stored in its full-charge state for a predetermined period of time, for example, within the range of 50° C. to 65° C.

Various factors such as (1) powder characteristics of the positive electrode active material, (2) additives into the liquid electrolyte, (3) liquid electrolyte composition, (4) sealability of the outer package case, and (5) thermal stability of electrolytic lithium salt seem to contribute to increasing the recovery capacity or lowering the self-discharge after such a high-temperature storage. For example, when a Co type oxide was used as a positive electrode active material, there was a case where the recovery capacity was improved to a recovery of 90% to 95% by optimizing the above-mentioned items (1) to (5).

Though such a recovery amount of about 90% can be used in practice, there is a strong desire for further increasing the battery recovery capacity after high-temperature storage and ideally realizing a 100% recovery in order to respond to demands for longer life and higher capacity of the battery used in a portable terminal or the like. However, lithium-ion secondary batteries using the conventional complex oxides as their positive electrode active material do not aim at improving the capacity recovery after high-temperature storage, and their recovery characteristics are not always found satisfactory according to the knowledge of the inventors.

In view of such circumstances, it is an object of the present invention to provide an electrode active material which can fully reduce the decrease in capacity of a lithium-ion secondary battery after high-temperature storage while keeping the high capacity thereof, and an electrode including the same. It is another object of the present invention to provide a highly functional lithium-ion secondary battery which can fully reduce the decrease in capacity after high-temperature storage while keeping the high capacity in a steady state. It is a further object of the present invention to provide methods of making an electrode active material and a lithium-ion secondary battery which can exhibit such excellent characteristics.

The inventors conducted diligent studies while taking account of compound materials used for the positive electrode active material and their compositions and, as a result, have completed the present invention. Namely, the electrode active material in accordance with the present invention is used for a positive electrode for a lithium-ion secondary battery, includes Li, Mn, Ni, Co, and O atoms, and has a substantially halite type crystal structure.

Normally, crystalline multiple type materials such as complex oxides include various crystal structures. For example, complex oxides used as a positive electrode active material, such as spinel manganese, mainly exhibit a spinel form. Studies conducted by the inventors have verified that lithium-ion secondary batteries using complex oxides, mainly composed of Li, Mn, Ni, Co, and O, mainly having the crystallinity of a halite type structure (a basic crystal form of NaCl) as a positive electrode active material is excellent in high-temperature stability and safety and sufficiently prevent capacity recovery characteristics from deteriorating after high-temperature storage.

Though one of factors deteriorating the capacity recovery characteristic after high-temperature storage seems to lie in that metal ions in the positive electrode active material dissolve into the liquid electrolyte during high-temperature storage, the above-mentioned complex oxide having a halite form constituting the present invention is presumed to suppress the amount of elution into the electrolyte as compared with conventionally used compounds such as lithium cobalt oxide, lithium manganese oxide spinel, and lithium nickel oxide, for example.

When the thermal stability of a lithium-ion secondary battery comprising the electrode active material of the present invention as a positive electrode active material was measured in its full-charge state by a differential scanning calorimeter (DSC), its exothermic temperature was found to be higher than that of conventional batteries using the other compounds mentioned above as a positive electrode active material.

Therefore, the thermal stability of the positive electrode active material is assumed to be closely related to the capacity recovery characteristic after high-temperature storage. Though the reactivity of elution into the electrolyte seems to depend on electrolyte solvents and other constituents such as additives as well, synergic effects between their own thermal stability and the thermal stability of the complex oxide are presumed to drastically enhance the high-temperature stability as a battery. Operations are not limited thereto, however.

Further, as will be explained later, it has been found that using the positive electrode active material in accordance with the present invention can keep swelling phenomena of the lithium-ion secondary battery from occurring in high-temperature environments, and enhance the stability in high-charge states (full-charge state and overcharged state), whereby safety and cycle characteristics of the lithium-ion secondary battery can be improved.

Specifically, the electrode active material is preferably an oxide represented by the following expression (1):

$$Li_aMn_bNi_cCo_dO_e \quad (1)$$

Here, a, b, c, d, and e satisfy the relationships represented by the following expressions (2) to (7):

$$0 < a \leq 1.1 \quad (2)$$

$$0 < b \leq 0.6 \quad (3)$$

$$0 < c \leq 1.0 \quad (4)$$

$$0 < d \leq 1.0 \quad (5)$$

$$1 \leq e \leq 2 \quad (6)$$

$$b+c+d=1 \quad (7)$$

More preferably, a, b, c, d, and e in expression (1) satisfy the relationships represented by the following expressions (6) to (11):

$$1 \leq e \leq 2 \quad (6)$$

$$b+c+d=1 \quad (7)$$

$$0.85 \leq a \leq 1.1 \quad (8)$$

$$0.2 \leq b \leq 0.6 \quad (9)$$

$$0.2 \leq c \leq 0.6 \quad (10)$$

$$0.1 \leq d \leq 0.5 \quad (11)$$

Here, suffixes a, b, c, d, and e indicate the elemental composition ratio (atomic number ratio) of the complex oxide as shown in expression (1), and represent a relative elemental composition in which the total composition ratio of Mn, Ni, and Co is normalized to 1 as shown in expression (7). Also, this makes it possible to represent the composition of Mn, Ni, and Co in a three-element map, which will be explained later in detail.

It has been verified that a halite type crystal structure is easy to form as an electrode active material when the composition of the complex oxide falls within a range satisfying expressions (2) to (7), and that a halite type crystal structure is more reliably formed when expressions (6) to (11) are satisfied.

Further studies about physical properties concerning the above-mentioned thermal stability have elucidated it specifically more preferable for the electrode active material to have an exothermic peak temperature of at least 280° C. in differential scanning calorimetry in a state having a potential of 4.3 V with reference to lithium metal.

The electrode in accordance with the present invention is used for a positive electrode of a lithium-ion secondary battery, and comprises an electrode active material containing Li, Mn, Ni, Co, and O atoms and having a halite type crystal structure.

The lithium-ion secondary battery in accordance with the present invention is a useful one using the electrode active material of the present invention and comprising a positive electrode including a first electrode active material containing Li, Mn, Ni, Co, and O atoms and having a halite type crystal structure; a negative electrode disposed so as to oppose the positive electrode; and an electrolyte disposed between the positive and negative electrodes.

Preferably, the electrolyte is disposed between the positive and negative electrodes while in a liquid electrolyte state dissolved or dispersed in a solvent including a carbonate compound.

More preferably, the liquid electrolyte contains a cyclic carbonate compound, a chain carbonate compound, and an alkyl sultone.

It will be useful if the liquid electrolyte satisfies the relationship represented by the following expression (12):

$$10 \leq Nk/(Nk+Ns) \times 100 \leq 50 \quad (12)$$

where Nk is the total content of the cyclic carbonate compound, and Ns is the total content of the chain carbonate compound.

It will also be useful if the liquid electrolyte contains ethyl methyl carbonate as the chain carbonate and satisfies the relationship represented by the following expression (13):

$$Ne/(Nk+Ns) \times 100 \leq 50 \quad (13)$$

where Nk is the total volume of the cyclic carbonate compound, Ns is the total volume of the chain carbonate compound, and Ne is the total volume of ethyl methyl carbonate.

It will also be useful if the liquid electrolyte contains dimethyl carbonate as the chain carbonate and satisfies the relationship represented by the following expression (14):

$$Ng/(Nk+Ns) \times 100 \leq 30 \quad (14)$$

where Nk is the total volume of the cyclic carbonate compound, Ns is the total volume of the chain carbonate compound, and Ng is the volume of dimethyl carbonate.

It will further be useful if the liquid electrolyte contains 1,3-propane sultone as the alkyl sultone and satisfies the relationship represented by the following expression (15):

$$1 \leq Wa \leq 5 \quad (15)$$

where Wa is the mass ratio (%) of 1,3-propane sultone in the liquid electrolyte.

Specifically, it will further be preferable if the liquid electrolyte contains a lithium salt as an electrolyte salt and satisfies the relationship represented by the following expression (16):

$$0.3 \leq Ml \leq 5 \quad (16)$$

where Ml is the mole concentration (mol/L) of the lithium salt in the liquid electrolyte.

More specifically, it will be more preferable if the liquid electrolyte includes lithium hexa fluorophosphate as an electrolyte salt.

Preferably, the negative electrode comprises a second electrode active material including a C atom, whereas the second electrode active material is more preferably graphite.

It will also be preferable if the negative electrode comprises a third electrode active material including Li, Ti, and O atoms, where as the third electrode active material is more preferably an oxide, i.e., lithium titanate, represented by the following expression (17):

$$Li_{1+x}Ti_{2-x}O_y \quad (17)$$

where x and y satisfy the relationships represented by the following expressions (18) and (19):

$$-0.2 \leq x \leq 1.0 \quad (18)$$

$$3.0 < y \leq 4.0 \quad (19)$$

The method of making an electrode active material in accordance with the present invention is a method for effectively making the electrode active material of the present invention, the method comprising the steps of preparing a first solution by dissolving an acid salt including an Mn atom, an acid salt including an Ni atom, and an acid salt including a Co atom into water or a solvent mainly composed of water; preparing a second solution by mixing the first solution with a solution including an $NH_4^+$ ion; forming a complex salt including Mn, Ni, and Co atoms by drying the second solution; and thermally reacting the complex salt with LiOH in an atmospheric air, so as to yield an electrode active material including Li, Mn, Ni, Co, and O atoms and having a substantially halite type crystal structure.

The method of making a lithium-ion secondary battery in accordance with the present invention is a method for effectively making the lithium-ion secondary battery of the present invention, the method comprising the steps of charging an uncharged lithium-ion secondary battery comprising a positive electrode including an electrode active material containing Li, Mn, Ni, Co, and O atoms and having a halite type crystal structure and a negative electrode disposed so as to oppose the positive electrode, such that the lithium-ion secondary battery attains a capacity of at least about 50% of a full-charge capacity determined beforehand for the lithium-ion secondary battery; and annealing thus charged lithium-ion secondary battery at a temperature of at least 60° C.

Preferably, in this case, the charged lithium-ion secondary battery is annealed for at least 4 hours at a temperature of 70° C. to 90° C.

Along with the course of studies so far, the present invention can also be expressed as follows:

(a) A lithium-ion secondary battery comprising positive and negative electrodes each having an electrode active material adapted to occlude and release at least a lithium ion, a binder, and a collector; and a liquid electrolyte; wherein the electrode active material of the positive electrode is a metal oxide expressed by:

$$Li_xMn_yNi_zCo_{1-y-z}O_w$$

where $0 \leq x \leq 1$, $0 \leq y \leq 0.6$, $0 \leq z \leq 1.0$, $0 \leq y+z \leq 1$, and $1 \leq w \leq 2$; the lithium-ion secondary battery containing a cyclic carbonate compound as the liquid electrolyte.

(b) A lithium-ion secondary battery according to the above-mentioned (a), wherein the metal oxide has a halite type crystal structure.

(c) A lithium-ion secondary battery comprising positive and negative electrodes each having an electrode active material adapted to occlude and release at least a lithium ion, a binder, and a collector; and a liquid electrolyte; wherein the electrode active material of the positive electrode is a metal oxide expressed by:

$$Li_xMn_yNi_zCo_{1-y-z}O_w$$

where $0.85 \leq x \leq 1.1$, $0 \leq y \leq 0.6$, $0 \leq z \leq 1$, $0 \leq y+z \leq 1$, and $1 \leq w \leq 2$; wherein the lithium-ion secondary battery contains a cyclic carbonate compound as the liquid electrolyte; wherein the lithium salt concentration in the liquid electrolyte is at least 1 mol but not greater than 3 mol; and wherein the lithium-ion secondary battery charged at a charging ratio of at least 50% with respect to a full-charge state, then annealed under a high temperature condition of at least 70° C., and thereafter held in the full-charge state for 4 hours at 90° C. yields an impedance change ratio of 125% or less and a voltage keeping ratio of at least 98.5%.

(d) A lithium-ion secondary battery according to the above-mentioned (c), annealed for at least 4 hours at a temperature of at least 70° C. but not higher than 90° C.

(e) A lithium-ion secondary battery according to the above-mentioned (c) or (d), wherein the metal oxide has a halite type crystal structure.

(f) A lithium-ion secondary battery according to any of the above-mentioned (c) to (e), contained within a metal laminate film outer package.

(g) A lithium-ion secondary battery according to any of the above-mentioned (c) to (f), comprising lithium hexa fluorophosphate as an electrolyte salt.

(h) A lithium-ion secondary battery unit connecting at least two lithium-ion secondary batteries in series, each lithium-ion secondary battery comprising positive and negative electrode plates opposing each other, and a separator and an electrolyte which are disposed between the positive and negative electrode plates opposing each other, the positive electrode plate comprising a positive electrode active material including a compound represented by $LiMO_2$, where M is a metal element including at least three species of Mn, Ni, and Co, the negative electrode active material comprising a negative electrode active material including a carbon type material.

(i) A lithium-ion secondary battery unit according to the above-mentioned (h), wherein $LiMO_2$ is $Li_xMn_yNi_zCo_{1-y-z}O_w$, where $0.85 \leq x \leq 1.1$, $0 \leq y \leq 0.6$, $0 \leq z \leq 1$, and $1 \leq w \leq 2$ in the atomic ratio in the expression.

(j) A lithium-ion secondary battery unit according to the above-mentioned (h) or (i), wherein the carbon type material is graphite.

(k) A lithium-ion secondary battery unit connecting at least two lithium-ion secondary batteries in series, each lithium-ion secondary battery comprising positive and negative electrode plates opposing each other, and a separator and an electrolyte which are disposed between the positive and negative electrode plates opposing each other, the positive electrode plate comprising a positive electrode active material including a compound represented by $LiMO_2$, where M is a metal element including at least three species of Mn, Ni, and Co, the negative electrode active material comprising a negative electrode active material including a compound represented by $Li_{1+x}Ti_{2-x}O_y$, where $-0.2 \leq x \leq 1.0$ and $3.0 \leq y \leq 4.0$ in the atomic ratio in the expression.

(l) A lithium-ion secondary battery unit according to the above-mentioned (k), wherein $LiMO_2$ is $Li_xMn_yNi_zCo_{1-y-z}O_w$, where $0.85 \leq x \leq 1.1$, $0 \leq y \leq 0.6$, $0 \leq z \leq 1$, and $1 \leq w \leq 2$ in the atomic ratio in the expression.

(m) A lithium-ion secondary battery comprising positive and negative electrode plates opposing each other, and a separator and an electrolyte which are disposed between the positive and negative electrode plates opposing each other, the positive electrode plate comprising a positive electrode active material including a compound represented by $LiMO_2$, where M is a metal element including at least three species of Mn, Ni, and Co, the negative electrode active material comprising a negative electrode active material including a compound represented by $Li_{1+x}Ti_{2-x}O_y$, where $-0.2 \leq x \leq 1.0$ and $3.0 \leq y \leq 4.0$ in the atomic ratio in the expression.

(n) A lithium-ion secondary battery according to the above-mentioned (m), wherein LiMO$_2$ is Li$_x$Mn$_y$Ni$_z$Co$_{1-y-z}$O$_w$, where $0.85 \leq x \leq 1.1$, $0 \leq y \leq 0.6$, $0 \leq z \leq 1$, and $1 \leq w \leq 2$ in the atomic ratio in the expression.

(o) A lithium-ion secondary battery including a positive electrode, a negative electrode, a separator held between the positive and negative electrodes, a liquid electrolyte held between the positive and negative electrodes, and an outer package surrounding them; wherein the positive electrode comprises an electrode active material including a metal oxide represented by Li$_x$Mn$_y$Ni$_z$Co$_{1-y-z}$O$_w$, where $0.85 \leq x \leq 1.1$, $0 \leq y \leq 0.6$, $0 \leq z \leq 1$, $0 \leq y+z \leq 1$, and $1 \leq w \leq 2$ in the atomic ratio in the expression; wherein the liquid electrolyte includes at least a cyclic carbonate compound and a chain carbonate compound including at least ethyl methyl carbonate and/or dimethyl carbonate as a mixed solvent; and wherein the lithium-ion secondary battery includes 1,3-propane sultone by a ratio of 1 to 5 wt % with respect to the liquid electrolyte.

(p) A lithium-ion secondary battery according to the above-mentioned (o), wherein the mixed solvent includes the cyclic carbonate compound by a ratio of 10 to 50 vol % with respect to the mixed solvent, and ethyl methyl carbonate as the chain carbonate compound by a ratio of not greater than 50 vol % with respect to the mixed solvent.

(q) A lithium-ion secondary battery according to the above-mentioned (o) or (p), wherein the mixed solvent includes the cyclic carbonate compound by a ratio of 10 to 50 vol % with respect to the mixed solvent, and dimethyl carbonate as the chain carbonate compound by a ratio of not greater than 30 vol % with respect to the mixed solvent.

(r) A lithium-ion secondary battery according to any of the above-mentioned (o) to (q), wherein the outer package is an outer package made of a metal laminate film.

(s) A lithium-ion secondary battery according to any of the above-mentioned (a) to (r), wherein the amount of increase in the thickness of the lithium-ion secondary battery charged to a full-charge state and then stored at a high temperature of 90° C. for 5 hours is not greater than 5% of the battery thickness before the high-temperature storage.

(t) A method of making a lithium-ion secondary battery, the method comprising the steps of charging the lithium-ion secondary battery according to any of the above-mentioned (o) to (r) at a charging ratio of at least 50% with respect to a full-charge state, and then annealing it for at least 4 hours within the temperature range of 60° C. to 100° C.

BRIEF DESCRIPTION OF THE DRAWINGS

FIG. 5 is a graph showing the X-ray diffraction spectra of the positive electrode active materials used in Example 3 and Comparative Example 2.

BEST MODES FOR CARRYING OUT THE INVENTION

Figure 1:
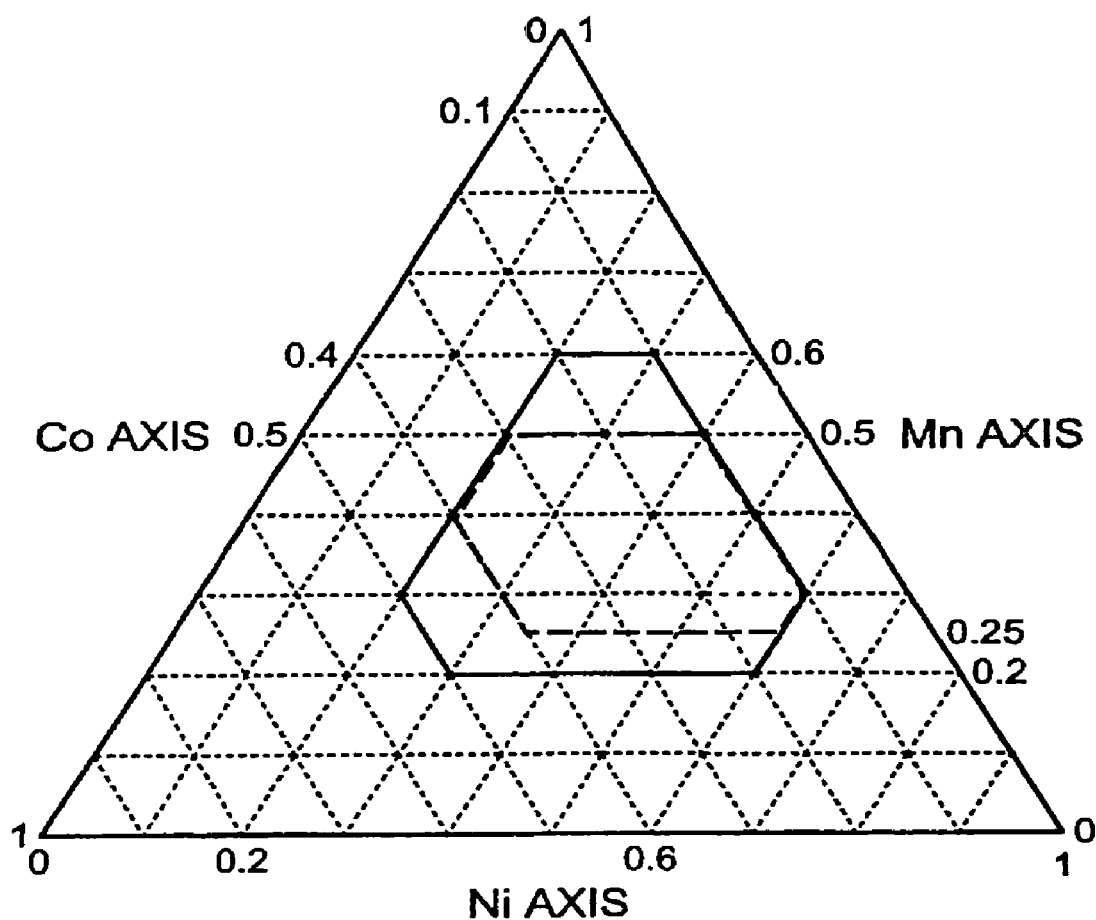
FIG. 1 is a three-element map showing the range of elemental composition ratio of Mn, Ni, and Co in the five main constituent elements of a quaternary metal oxide which is an electrode active material of the present invention.

In the following, preferred embodiments of the electrode active material of the present invention used for a lithium-ion secondary battery, the electrode of the present invention, other constituent members, the lithium-ion secondary battery of the present invention using them, and methods of making them will be explained.

Positive Electrode Active Material

The electrode active material in accordance with the present invention is a positive electrode active material (first electrode active material) used for a positive electrode for a lithium-ion secondary battery, and is a complex oxide including Li; Mn, Ni, Co, and O atoms, and has a substantially halite type crystal structure.

A so-called quaternary metal oxide (or lithium ternary oxide) including the above-mentioned four kinds of main metal elements is represented by the following expression (1):

$$Li_a Mn_b Ni_c Co_d O_e \qquad (1)$$

whereas this composition preferably satisfies the relationships represented by the following expressions (2) to (7):

$$0 < a \leq 1.1 \qquad (2)$$

$$0 < b \leq 0.6 \qquad (3)$$

$$0 \leq c \leq 1.0 \qquad (4)$$

$$0 < d \leq 1.0 \qquad (5)$$

$$1 \leq e \leq 2 \qquad (6)$$

$$b+c+d=1 \qquad (7)$$

As mentioned above, the composition ratios in the expressions are values normalized to the total amount ratio of Mn, Ni, and Co as shown in expression (7). In the other way around, composition ratios of Mn, Ni, and Co can be expressed by a three-element map as long as expressions (2) and (6) are satisfied.

More preferably, the composition is formed so as to satisfy the relationships represented by the following expressions (6) to (11):

$$1 \leq e \leq 2 \qquad (6)$$

$$b+c+d=1 \qquad (7)$$

$$0.85 \leq a \leq 1.1 \qquad (8)$$

$$0.2 \leq b \leq 0.6 \qquad (9)$$

$$0.2 \leq c \leq 0.6 \qquad (10)$$

$$0.1 \leq d \leq 0.5 \qquad (11)$$

Here, as mentioned above, FIG. 1 is a three-element map showing the range of elemental composition ratio of Mn, Ni, and Co in the five main constituent elements of the quaternary metal oxide. In the map, the range represented by expressions (9) to (11) is surrounded with solid lines.

It is verified that the electrode active material within such a composition ratio range is easy to form a halite type crystal structure reliably. It is also verified that using the electrode active material in such a composition ratio range tends to exhibit characteristics and performances inherent in the active material more strongly, so that not only the capacity and safety of the battery can fully be restrained from decreasing, but its high-temperature stability and, consequently, its capacity recovery characteristic after high-temperature storage improve.

In particular, a quite excellent high-temperature stability is exhibited when the composition ratio of Ni is not greater than the upper limit shown in expression (10), whereas the capacity of the positive electrode active material does not decrease when the composition ratio is not lower than the lower limit shown in expression (10), thereby exhibiting sufficient battery characteristics.

This is presumed to be because of the fact that, as mentioned above, the halite form dominating the crystal structure of the electrode active material not only suppresses the elution into the liquid electrolyte as compared with electrode active materials in which other crystal types such as spinel form are significant and enhances the thermal stability, but causes a synergistic effect with other constituents of the battery. However, there remain unclear points in the details thereof, whereby operations are not restricted thereto.

Further, in addition to the capacity recovery characteristic after high-temperature storage, the inventors considered it important to keep the battery from inflating during high-temperature storage from the viewpoint of stability at the time of high-temperature storage. In particular, while metal laminate films (laminates of metal foils such as aluminum foils and resin films), which are excellent in blocking water and atmospheric air and in economical efficiency in spite of their lightness and thinness, have recently been tried to be employed as an outer package for a lithium-ion secondary battery in order to achieve a higher capacity and a lighter weight at the same time, the battery using such an outer package tends to have a strength lower than that equipped with a heavy and thick outer package (can or the like), thus yielding a fear of the battery swelling phenomenon becoming more remarkable at the time of storage.

Various factors such as the above-mentioned (1) powder characteristics of the positive electrode active material, (2) additives into the liquid electrolyte, (3) liquid electrolyte composition, (4) sealability of the outer package case, and (5) thermal stability of electrolytic lithium salt seem to contribute to such a swelling of the battery.

For example, there are cases where the thickness of battery swelling is suppressed to about 5% or less with respect to the total thickness of the battery when the items of (1) to (5) are optimized while using Co type oxides as a positive electrode active material (see, for example, Japanese Patent Application Laid-Open No. HEI 13-291517 for (1), Japanese Patent Application Laid-Open No. HEI 11-273732 for (2), Japanese Patent Application Laid-Open No. HEI 12-235868 for (3), Japanese Patent Application Laid-Open No. HEI 13-307684 for (4), and Japanese Patent Application Laid-Open No. HEI 11-250932 for (5)).

In general, the swelling of a battery is evaluated by measuring the change in thickness of the battery placed in a high-temperature environment on the order of 50° C. to 100° C., for example. Evaluating the occurrence of swelling in the lithium-ion secondary battery using the electrode active material of the present invention in the high-temperature environment verifies that one subjected to a predetermined annealing process can sufficiently eliminate the swelling phenomenon as will be explained later.

One of reasons therefor is presumed to be that, as can be assumed from the fact that the amount of elution into the liquid electrolyte is suppressed, the electrode active material of the present invention has a high chemical stability and a low reactivity, so as to exhibit a high stability at a high temperature, whereas a slight reaction with the liquid electrolyte proceeds upon annealing, thereby deactivating active points in the positive electrode active material accelerating gas generations. The fact that the amount of eluted materials derived from the electrode active material in the liquid electrolyte is reduced also seems to be essentially influential. However, operations are not restricted thereto.

Further, the above-mentioned $LiCoO_2$, which is a typical conventional positive electrode active material, is known to deteriorate its thermal stability as lithium is desorbed therefrom, and its deterioration in thermal stability tends to become remarkable at a potential exceeding the full charge in particular. In this case, safety remarkably decreases at the time of full charge or overcharge.

A typical charging upper limit voltage of a battery using $LiCoO_2$ as a positive electrode active material is 4.3 V with reference to lithium metal, which voltage is at a value near the potential where a structural change accompanying a crystal phase change of $LiCoO_2$ occurs. Hence, there is a strong fear of the safety and cycle characteristics of the battery remarkably deteriorating even when a slightly overcharged state is passed.

Such a demerit occurring when $LiCoO_2$ is used as a positive electrode active material becomes a severe problem in the safety when further enhancing the energy density of the lithium-ion secondary battery. At the same time, it may also cause fluctuations in impedance or capacity among lithium-ion secondary battery products.

Lithium-ion secondary batteries are used not only as single cells, but often as units in which a plurality of batteries are connected in series for attaining a higher voltage. When such a unit is used for a high voltage, characteristics may vary among individual batteries because of impedance fluctuations, capacity fluctuations, and the like of the batteries, thereby yielding a battery attaining a charged state exceeding a safe charged state. However, as mentioned above, batteries using $LiCoO_2$ as a positive electrode active material have a low thermal stability in a high charge state, so that their safety and cycle characteristics are problematic, whereby they tend to be harder to form a unit.

Though batteries can easily be connected in series to form a unit if fluctuations in characteristics of batteries, fluctuations in characteristics after the lapse of a charging/discharging cycle in particular, by strict production control are eliminated, it is quite difficult in practice.

By contrast, as mentioned above, the electrode active material in accordance with the present invention is quite excellent in thermal stability, so that it can prevent its crystal structure from changing even when the battery attains an overcharged state, thereby suppressing the deterioration in battery characteristics over time. Therefore, it can improve safety and cycle characteristics, so that batteries can easily be connected in series to form a unit, whereby its applicability to high-voltage purposes can be enhanced. Also, fluctuations in impedance or capacity among battery products can fully be suppressed.

More preferably, it is formed so as to satisfy the relationships represented by expressions (7) and (8) and the following expressions (17) to (19):

$$0.25 \leq b \leq 0.5 \tag{17}$$

$$0.2 \leq c \leq 0.6 \tag{18}$$

$$0.1 \leq d \leq 0.5 \tag{19}$$

The range of element composition ratio of Mn, Ni, and Co represented by these expressions (17) to (19) is surrounded by broken lines in FIG. 1.

Such a range of composition ratio can enhance the structural stability of halite type crystals, thereby further improving the high-temperature stability.

Method of Making Positive Electrode Active Material

An example of procedure of making the electrode active material in accordance with the present invention will now be explained.

First, manganese sulfate (acid salt including Mn atoms), nickel sulfate (acid-salt including Ni atoms), and cobalt sulfate (acid salt including Co atoms) are dissolved at a predetermined compounding ratio (prescription) into pure water, so as to yield a salt mixture solution (first solution). Subsequently, the mixture solution is added to a mixed solution constituted by ammonium bicarbonate, concentrated aqueous ammonia, and pure water, and is fully stirred and mixed therewith, so as to be dissolved therein, thus yielding an ammonia mixture solution (second solution). Then, the ammonia mixture solution is fully dried, so as to yield an Mn/Ni/Co complex carbonate (complex salt). Thereafter, the complex carbonate is caused to react with LiOH in the atmospheric air preferably at a temperature of 650° C. to 850° C., more preferably 700° C. to 800° C., further preferably about 800° C., so as to yield the electrode active material of a halite type represented by expression (1).

When the positive electrode active material is used as powder or fine particle in the positive electrode of a lithium-ion secondary battery, its average particle size is preferably about 5 to 20 μm, more preferably about 7 to 15 μm. When the average particle size is less than 5 μm, there is a fear of the processability of the electrode deteriorating disadvantageously, so that the stability of the electrode may be lost in excess. When the average particle size exceeds 20 μm, on the other hand, it takes too much time for ions to disperse into particles, thereby making it easier to inhibit uniform charging/discharging and deteriorate rate characteristics, and so forth.

The BET specific surface area of the electrode active material powder or particle at that time is preferably 0.1 to 1.0 m²/g, more preferably about 0.1 to 0.8 m²/g. When the BET specific surface area is less than 0.1 m²/g, problems similar to those generated in the above-mentioned case where the average particle size increases in excess are likely to occur. When the BET specific surface area exceeds 1.0 m²/g, on the other hand, problems similar to those generated in the above-mentioned case where the average particle size decreases in excess are likely to occur.

Negative Electrode Active Material

Metal lithium, lithium alloys (complex metals), oxides including no Li atoms, oxides including Li atoms, and those including C atoms, i.e., carbonaceous materials (second electrode active material), and the like can be employed as the electrode active material used in the negative electrode, which is an electrode opposing the positive electrode including the positive electrode active material of the present invention, i.e., negative electrode active material.

Li-Al, LiSi, LiSn, and the like can be listed as the lithium alloys, where as $Nb_2O_5$, SnO, and the like can be listed as the oxides including no Li atoms. However, carbonaceous materials or specific oxides including Li atoms are preferably used from the following viewpoint.

Using carbonaceous materials as a negative electrode active material is advantageous in making it easier for the lithium-ion secondary battery to increase its capacity as compared with the other negative electrode active materials mentioned above. Examples of such carbonaceous materials include meso-phase carbon microbead (MCMB), meso-phase carbon fiber (MCF), cokes, vitreous carbon, sintered or fired bodies of organic polymer compounds, carbon black, carbon fibers, natural graphites, and the like.

Among them, synthetic graphites such as MCMB and MCF are more preferable in that lithium ions can easily be inserted therein and desorbed therefrom so as to cause the lithium-ion secondary battery to attain a relatively high capacity, and in that uniform products can be obtained at a low cost.

Natural graphites include a relatively large amount of impurities, so that film quality is likely to deteriorate when a film is formed at the initial charging of the lithium-ion secondary battery. By contrast, using synthetic graphites can prevent such inevitable impurities from becoming influential, thereby making it easier to form a film having a favorable ion permeability.

In particular, synthetic graphites whose lattice spacing between lattice planes (002) is 0.335 to 0.380 nm is preferable. The lattice spacing between (002) planes can be determined by structural analyses according to X-ray diffraction used in general.

An example of specific oxides including Li atoms suitable as a negative electrode active material is lithium titanate (third electrode active material) represented by the following expression (17):

$$Li_{1+x}Ti_{2-x}O_y \qquad (17)$$

In expression (17), suffixes (1+x), (2−x), and y respectively indicate composition ratios of Li, Ti, and O atoms in the oxide, where as x and y respectively satisfy the relationships represented by the following expressions (18) and (19):

$$0.2 \leq x \leq 1.0 \qquad (18)$$

$$3.0 < y \leq 4.0 \qquad (19)$$

In lithium titanate in such a composition ratio range, lattice spacing is unlikely to change substantially even when lithium ions come into and out of its lattices. Therefore, no distortions occur in the negative electrode active material and, consequently, in the negative electrode structure, whereby a lithium-ion secondary battery having a favorable cycle characteristic can be formed.

Here, a relatively large capacity can be realized when a carbonaceous material is used as a negative electrode active material as mentioned above. Since the potential for inserting lithium ions into the electrode and the potential for metallizing lithium ions are close to each other, however, lithium metal tends to deposit on the negative electrode surface, whereby lithium dendrite, which is a tree-like crystal, is likely to be formed. Lithium dendrite also tends to be formed easily in a similar manner when lithium metal and lithium alloys are used as a negative electrode active material.

This has been known to cause the fear of short-circuiting when in use, thereby lowering the cycle characteristics/safety of the lithium-ion secondary battery. In particular, when connecting a plurality of lithium-ion secondary batteries in series so as to form a unit for high-voltage uses as will be explained later, fluctuations in capacity among the batteries may cause an overcharged state, i.e., a state where lithium ions are inserted in excess into the negative electrode, in a part of batteries in the unit. In this case, lithium dendrite is more likely to occur than in the case where a battery is used alone, whereby the unit lowers its cycle characteristics and safety.

Using lithium titanate within the above-mentioned preferable composition range as a negative electrode active material can remarkably lower the possibility of lithium dendrite being formed, since the potential of insertion/desorption of lithium ions with respect to the lithium titanate structure is higher than the deposition potential for lithium metal by about 1.5 V. This can fully prevent short circuits and the like from occurring and restrain the cycle characteristics and safety from deteriorating.

When the foregoing various negative electrode active materials are used as powder or fine particle for the negative electrode of the lithium-ion secondary battery, their average particle size is preferably about 1 to 30 μm, more preferably about 5 to 25 μm.

When the average particle size is less than 1 μm, the charging/discharging cycle life tends to become too short, whereas fluctuations in capacity among individuals (individual differences) tend to increase in excess. When the average particle size exceeds 30 μm, fluctuations in capacity among individuals tend to increase further remarkably, whereas the average capacity tends to decrease in excess.

The reason why fluctuations in capacity occur when the average particle size is too large as such seems to be because significant fluctuations occur in the degree of contact between the negative electrode active material and the collector or between negative electrode active materials.

Configuration of Lithium-Ion Secondary Battery

Figure 2:
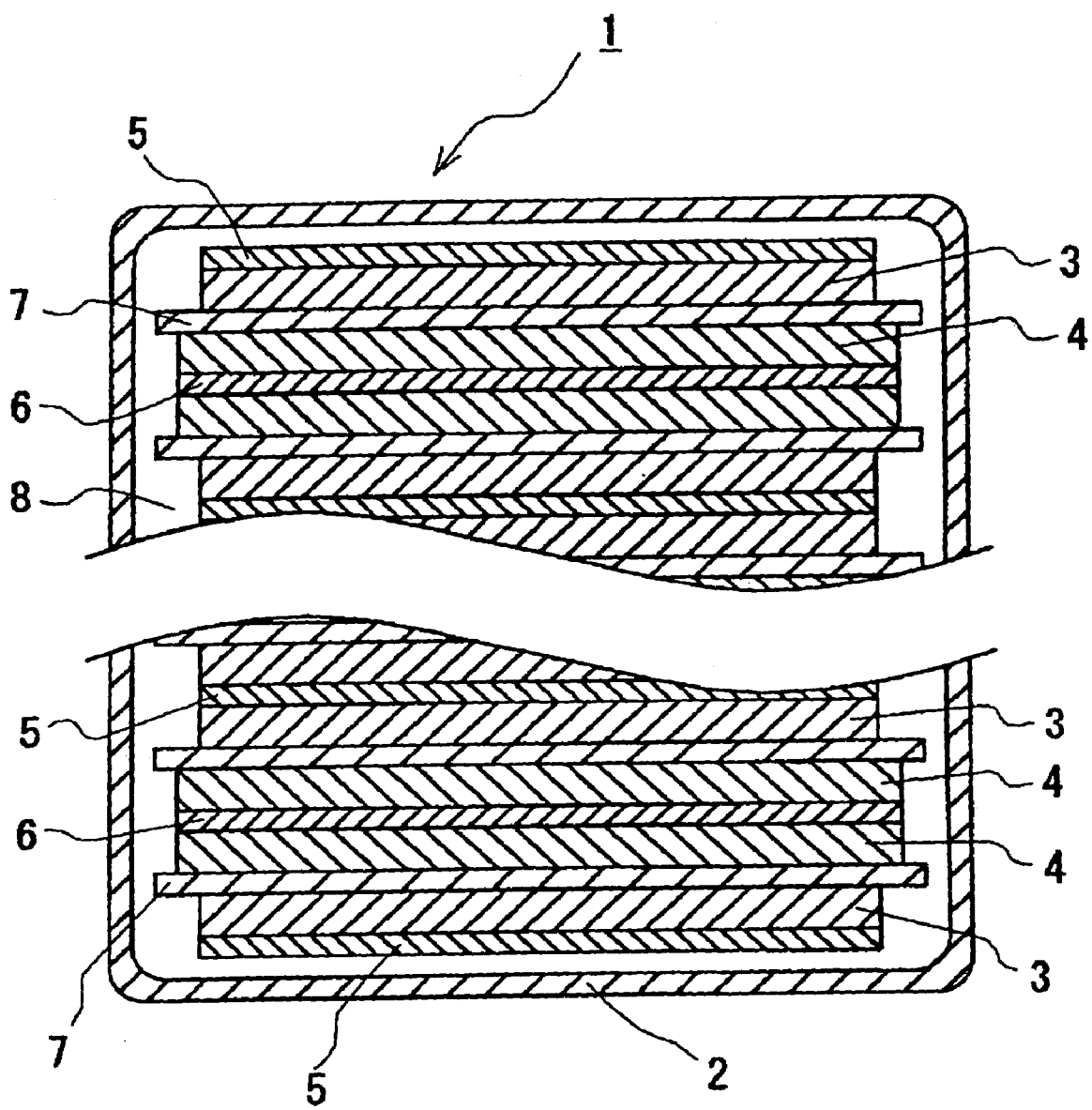
FIG. 2 is a schematic sectional view showing the configuration of a preferred embodiment of the lithium-ion secondary battery in accordance with the present invention.

The above-mentioned lithium-ion secondary battery 1 shown in FIG. 2 comprises a positive electrode 3 (corresponding to the electrode of the present invention), a negative electrode 4, and a separator 7 which are laminated or wound, while being mounted within an outer package 2 together with an electrolyte 8. The lithium-ion secondary battery 1 can be shaped into various forms such as laminated battery and cylindrical battery.

Outer Package

For example, cans made of carbon steel, stainless steel, aluminum alloys, aluminum metal, and the like can be used as the outer package 2. It may also be a bag made of a laminate (laminate film) made of a metal foil and a resin film. Using such a bag can make the lithium-ion secondary battery 1 thinner and lighter, and enhance its barrier property against the outside air and water, whereby battery characteristics can be prevented from deteriorating.

Preferred examples of such a laminate film include laminates obtained when polyolefin type thermosetting or thermobonding resin layers such as polypropylene and polyethylene, polyester type heat-resisting resin layers, and the like are laminated on both sides of a metal foil such as aluminum in order to secure insulation between the metal foil and a lead-out terminal. The order of laminating resin layers is not restricted in particular.

When such a laminate film is used, the polyester resin layer having a high melting point remains without melting upon heat-bonding, thereby making it possible to secure a spacing distance between the lead-out terminal and the metal foil, and establish sufficient insulation. More specifically, in this case, it will be preferred if the polyester resin layer of the laminate film is about 5 to 100 μm.

Positive and Negative Electrodes

Both of the positive electrode 3 and negative electrode 4 function to occlude and release lithium ions, and contain their respective electrode active materials (positive and negative electrode active materials, respectively), a binder, and a conductance enhancer if necessary.

The above-mentioned electrode active material is used as the positive electrode active material, where as various kinds of substances mentioned above are used as the negative electrode active material. The carrying amount of these electrode active materials is preferably 15 to 50 mg/cm$^2$ in the positive electrode 3, and 7 to 25 mg/cm$^2$ in the negative electrode 4. The energy density of the lithium-ion secondary battery 1 may practically come short if the carrying amount of electrode active material in the positive electrode 3 or negative electrode 4 is less than the lower limit of the preferable range thereof, whereas battery characteristics may deteriorate disadvantageously if the upper limit is exceeded.

The porosity of the positive electrode active material in the positive electrode 3 is preferably 15 to 40 vol %, whereas the porosity of the positive electrode active material in the negative electrode 4 is preferably 20 to 40 vol %.

For decreasing the thickness of electrodes 3, 4 in order to make the lithium-ion secondary battery 1 thinner, it will be more advantageous if the porosity is lower. In this case, however, the dispersion of lithium ions within the electrodes 3, 4 is more likely to be restricted inappropriately, whereby battery characteristics may deteriorate too much. Therefore, taking account of the balance between the battery thickness required for thinning and the viewpoint of keeping high battery characteristics, the porosities of electrode active materials preferably fall within the above-mentioned ranges.

Though the binder is not restricted in particular, thermoplastic elastomer resins such as fluorine-containing resins, polyolefin resins, styrene resins, and acrylic resins, and rubber resins such as fluorine-containing rubber can be used therefor, for example.

More specific examples include polytetrafluoroethylene, polyvinylidene fluoride (PVDF), polyethylene, polyacrylonitrile, nitrile rubber, polybutadiene, butylene rubber, polystyrene, styrene-butadiene rubber (SBR), polysulfide rubber, and the like, which can be used one by one or in a mixture of two or more. If necessary, various kinds of additives such as nitrocellulose, cyanoethylcellulose, and carboxymethylcellulose (CMC), for example, may be added to the binder.

Though the conductance enhancer is not restricted in particular, carbon fiber materials such as graphite, carbon black, acetylene black, and carbon fiber, and metals such as nickel, aluminum, copper, and silver can be used therefor, for example. Among them, carbon fiber materials such as graphite, carbon black, acetylene black, and carbon fiber are more preferable from the viewpoint of chemical stability, whereas acetylene black is particularly preferable from the viewpoint of its relatively high conductivity.

The positive electrode 3 and negative electrode 4 may use the same binder and conductance enhancer, or those different from each other. As the electrode composition, the mass ratio or weight ratio of positive electrode active material/conductance enhancer/binder is preferably within the range of 80 to 94/2 to 8/2 to 18 in the positive electrode 3, and the mass ratio or weight ratio of active material/conductance enhancer/binder is preferably within the range of 70 to 97/0 to 25/3 to 10 in the negative electrode 4.

The positive electrode 3 and negative electrode 4 are integrated with a positive electrode collector 5 and a negative electrode collector 6, respectively. Though the materials and forms of the positive electrode collector 5 and negative electrode collector 6 can appropriately be selected according to the polarity of electrodes, shape for use, and method of arrangement into the outer package (case), aluminum is preferably used as a material for the positive electrode collector 5, whereas aluminum, copper, or nickel is preferably used as a material for the negative electrode collector 6.

Collector

Preferred examples of forms of the collectors 5, 6 include metal foils and metal meshes. The metal foils and metal meshes can sufficiently lower contact resistance, among which the metal meshes are more preferable from the viewpoint of their large surface area which can further lower contact resistance.

Separator

Examples of materials for the separator 7 include porous films formed from materials including one or more kinds of polyolefins such as polyethylene and polypropylene (a laminate of two or more films in the case of two or more kinds), polyesters such as polyethylene terephthalate, fluorine-containing theremoplastic resins such as ethylene/tetra fluoroethylene copolymer, celluloses, and the like.

When forming the separator 7 into a sheet, examples thereof include microporous films, woven fabrics, and unwoven fabrics having a thickness of about 5 to 100 μm, whose air permeability measured by the method defined in JIS-P8117 is about 5 to 2000 sec/100 cc.

Preferably, the separator 7 has a shutdown function. This can prevent the battery from causing thermal runaway when pores of the separator 7 close in the case where an overcharge, internal short circuit, or external short circuit occurs in the lithium-ion secondary battery or the battery temperature rises drastically in some events.

Electrolyte

The electrolyte 8 is a lithium-ion conductive material, for which a liquid electrolyte or polymer electrolyte dissolving therein a lithium salt as an electrolyte salt is used. It may be a solid electrolyte as well.

Preferable as the solvent for the liquid electrolyte is a nonaqueous solvent which is poor in chemical reactivity with lithium, exhibits a favorable compatibility with polymer solid electrolytes, electrolyte salts, and the like, and imparts ionic conductivity. Also preferred are nonproton type polar organic solvents which do not decompose even at a high operating voltage.

Examples of such a solvent include carbonates such as ethylene carbonate (EC), propylene carbonate (PC), butylene carbonate, dimethyl carbonate (DMC), diethyl carbonate (DEC), and ethylmethyl carbonate; cyclic ethers such as tetra hydrofuran (THF) and 2-methyltetrahydrofuran; cyclic ethers such as 1,3-dioxolane and 4-methyl dioxolane; lactones such as γ-butyrolactone; sulfolanes; 3-methyl sulfolane; dimethoxyethane; diethoxyethane; ethoxymethoxyethane; and ethyl diglyme.

Among them, ethylene carbonate (EC), propylene carbonate (PC), and butylene carbonate are preferable, and the use of cyclic carbonates such as EC is more preferable in particular. These cyclic carbonates have characteristics with a higher dielectric constant and a higher viscosity as compared with chain carbonates. This accelerates dissociation of lithium salts, which are electrolyte salts included in the liquid electrolyte. From this viewpoint, the cyclic carbonates are preferable as the liquid electrolyte solvent for the lithium-ion secondary battery 1.

When the amount of cyclic carbonate in the solvent is so large that the viscosity of the electrolyte increases too much, the migration of lithium ions in the liquid electrolyte may be inhibited in excess, whereby the internal resistance of the battery may increase remarkably. For effectively preventing this from occurring, it will be preferable if a chain carbonate whose viscosity and dielectric constant are lower than those of the cyclic carbonate is mixed with the solvent. When the amount of chain carbonate in the liquid electrolyte is too much, by contrast, the dielectric constant of the solvent decreases remarkably, which makes it harder for the dissociation of lithium salts to proceed in the liquid electrolyte.

Therefore, the liquid electrolyte preferably satisfies the relationship represented by the following expression (12):

$$10 \leq Nk/(Nk+Ns) \times 100 \leq 50 \tag{12}$$

where Nk is the total content of the cyclic carbonate compound, and Ns is the total content of the chain carbonate compound.

Namely, when the mass ratio (%) or weight ratio (%) of the cyclic carbonate in the liquid electrolyte is 10% to 50%, it can fully suppress the increase in internal resistance of the battery while appropriately accelerating the dissociation of lithium salts in the liquid electrolyte.

More preferably, the liquid electrolyte using such a mixed solvent contains ethyl methyl carbonate as the chain carbonate and satisfies the relationship represented by the following expression (13):

$$Ne/(Nk+Ns) \times 100 \leq 50 \tag{13}$$

where Nk is the total volume of the cyclic carbonate compound in the mixed solvent, Ns is the total volume of the chain carbonate compound in the mixed solvent, and Ne is the volume of ethyl methyl carbonate in the mixed solvent.

When the liquid electrolyte contains dimethyl carbonate as the chain carbonate, it preferably satisfies the relationship represented by the following expression (14):

$$Ng/(Nk+Ns) \times 100 \leq 30 \tag{14}$$

where Nk and Ns are the same as those shown in expression (13), and Ng is the volume of dimethyl carbonate in the mixed solvent.

Namely, when the volume ratio of ethyl methyl carbonate with respect to the carbonate compounds in the mixed solvent is not greater than 50 vol % and/or the volume ratio of dimethyl carbonate with respect to the carbonate compounds in the mixed solvent is not greater than 30 vol %, it can keep the viscosity of the liquid electrolyte sufficiently low while further enhancing the conductivity of the liquid electrolyte, and can suppress the swelling of the battery during high-temperature storage while further improving battery characteristics of the lithium-ion secondary battery 1.

When the liquid electrolyte includes an alkyl sultone, it is advantageous in that the forming of a film having an excellent stability is accelerated on the surface of the negative electrode 4, whereby the reaction between the negative electrode 4 and the liquid electrolyte can be suppressed during storage at a high temperature. In particular, using 1,3-propane sultone as the alkyl sultone is more preferable in that its industrial usability is high, while the forming of the film proceeds sufficiently.

It will further be useful if the liquid electrolyte satisfies the relationship represented by the following expression (15):

$$1 \leq Wa \leq 5 \tag{15}$$

where Wa is the mass ratio or weight ratio (%) of 1,3-propane sultone in the liquid electrolyte.

When the mass ratio of 1,3-propane sultone is less than the lower limit of expression (15), the forming of the film for securing the safety of the negative electrode surface becomes insufficient, thereby making it difficult to suppress the reaction between the negative electrode 4 and liquid electrolyte during high-temperature storage.

When the mass ratio of 1,3-propane sultone exceeds the upper limit of expression (15), on the other hand, the capacity tends to decrease because of the forming of the film in excess. It is also disadvantageous in that the conductivity of the liquid electrolyte decreases in excess because of the rise in viscosity of the liquid electrolyte.

Examples of lithium salts (supporting electrolytes) to become sources for supplying lithium ions include salts such as $LiClO_4$, $LiPF_6$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, LiN (CF$_3$SO$_2$) (C$_4$F$_9$SO$_2$), and LiN(CF$_3$CF$_2$CO)$_2$, which can be used one by one or in combination of two or more.

Among them, the use of lithium hexa fluorophosphate is quite favorable in that it realizes a high ionic conductivity.

The concentration of lithium salt in the liquid electrolyte is preferably 0.3 to 5 mol/L (see expression (16)), more preferably 1 to 3 mol/L, further preferably 1 to 2.5 mol/L, 0.8 to 1.5 mol/L in particular.

A sufficiently high ionic conductivity is exhibited when the lithium salt concentration falls within the range of 0.3 to 5 mol/L.

When the lithium salt concentration exceeds 3 mol/L, the lithium salt may enhance the viscosity of the liquid electrolyte in excess, whereby the discharge capacity at a high rate or low temperature may decrease disadvantageously. When the lithium salt concentration is less than 1 mol/L, the supply of some lithium salts may fail to follow the consumption of lithium ions. Such a case also yields a fear of the discharge capacity at a high rate or lower temperature decreasing disadvantageously.

Additives maybe added to the liquid electrolyte when necessary. Examples of the additives include vinylene carbonate and organic compounds including sulfur. Adding them to the liquid electrolyte is quite favorable in that storage and cycle characteristics of the battery are further improved.

When the electrolyte is used in the form of a polymer electrolyte instead of the state (form) of a liquid electrolyte, the lithium-ion secondary battery 1 functions as a polymer secondary battery. Examples of the polymer electrolyte include gel-like polymer electrolyte and genuine polymer electrolyte.

Here, the gel-like polymer electrolyte is an electrolyte in which a nonaqueous liquid electrolyte is held within the polymer by swelling the polymer with a nonaqueous electrolyte. The genuine polymer electrolyte is an electrolyte in which a lithium salt is dissolved into a polymer.

As such a polymer, for example, copolymers of acrylates including polyacrylonitrile, polyethylene glycol, polyvinylidene fluoride (PVDF), polyvinyl pyrrolidone, polytetraethylene glycol diacrylate, polyethylenoxide diacrylate, and ethylene oxide with polyfunctional acrylates; polyethylene oxide; polypropylene oxide; copolymers of vinylidene fluoride with hexa fluoropropylene; and the like can be used.

When the gel-like polymer electrolyte is used, the film thickness of the polymer is preferably 5 to 100 μm, more preferably 5 to 60 μm, 10 to 40 μm in particular.

Method of Making Lithium-Ion Secondary Battery

Major parts of an example of the method of making the lithium-ion secondary battery 1 will now be explained. Here, an example using the above-mentioned nonaqueous liquid electrolyte as an electrolyte will be set forth.

First, the positive electrode 3 and negative electrode 4 are produced. Though the method of making the electrodes 3, 4 is not restricted in particular, they are preferably produced in the following procedure, for example. Namely, the above-mentioned electrode active materials to be used in the respective electrodes 3,4 and, if necessary, the above-mentioned conductance enhancer are dispersed into the above-mentioned binder solution, so as to prepare electrode coating liquids (compositions). Here, any solvent can be used as the solvent for the binder solution, as long as it can dissolve the binder therein. For example, N-methyl-2-pyrrolidone (NMP) and the like can be used.

Without being restricted in particular, a typical mixing and dispersing method can be used as a method of dispersing the electrode active materials and conductance enhancers into the binder solution. For example, mixing/dispersing apparatus such as hyper mixer, dissolver, Henschel mixer, planetary mixer, media type mill, and homomixer can be used one by one or in combination.

Subsequently, thus obtained electrode coating liquid is applied onto the positive collector 5 or negative collector 6. The coating method at this time is not restricted in particular, and can be selected appropriately according to the material or form of the positive electrode collector 5 or negative electrode collector 6. Specifically, for example, metal mask printing, electrostatic coating, dip coating, spray coating, roll coating, doctor blading, gravure coating, screen printing, and the like can be used.

Then, the solvent is evaporated, whereby the positive electrode 3 and negative electrode 4 formed by applying the electrode active material and binder onto the respective collectors 5, 6 are obtained. The coating thickness of the composition after evaporating the solvent is preferably about 50 to 400 μm in each of the positive electrode 3 and negative electrode 4. When it is necessary to adjust the thickness of thus obtained electrodes, rolling may be carried out by using flat press, calender rolls, and the like.

Thereafter, positive electrodes 3 thus formed on positive electrode collectors 5, negative electrodes 4 thus formed on negative electrode collectors 6, and separators 7 are combined together, so as to construct an electrode group. The structure of the electrode group can appropriately be selected as long as it can yield a desirable capacity. When combining them, it will be sufficient if the electrode group is finally constructed such that the separators 7 separate the positive electrodes 3 and the negative electrodes 4 from each other as shown in FIG. 2 so that no short circuit occurs there between.

For example, the positive electrodes 3, separators 7, and negative electrodes 4 may be laminated alternately and wound like a roll. The positive electrodes 3, separators 7, and negative electrodes 4 may be laminated alternately and bent as appropriate. The positive electrodes 3, separators 7, and negative electrodes 4 having an appropriate size may successively be laminated and formed into a sheet.

Thus obtained electrode group is accommodated in an outer package 2. When the outer package 2 is the above-mentioned bag constituted by laminate films, its constituents are initially laminated as appropriate, so as to form the laminate films. Subsequently, for example, two laminate film sheets are superposed on each other, and their heat-bonding resin layers are thermally bonded together at end portions of three of the four sides by fusing or the like, so as to form a sealed part, thus yielding a bag opening at one side. Alternatively, one laminate film sheet may be folded back in a superposing manner, and end parts on both sides (two sides) may similarly be heat-bonded, so as to form a sealed part, thus yielding a bag.

Then, a predetermined amount of the above-mentioned liquid electrolyte is injected into the outer package 2 accommodating the electrode group, so that the separators 7 are impregnated therewith. Here, the positive electrodes 3 and negative electrodes 4 are also impregnated with a part of the liquid electrolyte.

When injecting the liquid electrolyte for impregnation, it is necessary to prevent moisture from entering the inside of the battery. To this aim, the operation is preferably carried out in an atmosphere substituted by an inert gas, for example. This can reliably prevent the moisture contained in the atmospheric air or oxygen gases from entering the inside of the battery. The injection and impregnation of the liquid electrolyte may be carried out within a vacuum chamber as well. This can eliminate not only the moisture and oxygen gases, but bubbles (voids) which may occur because of gases taken up at the time of injecting the liquid.

After the completion of injection of the liquid electrolyte and impregnation therewith, the opening part of the outer package 2 is sealed, whereby an uncharged lithium-ion secondary battery 1 is obtained.

Thus obtained uncharged lithium-ion secondary battery 1 is preliminary charged, and then annealed under a predetermined condition. Specifically, a full-charge capacity (capacity electric charge) for the lithium-ion secondary battery 1 is determined beforehand, and then the same type of lithium-ion secondary battery 1 in an uncharged state is once preliminarily charged so as to attain a capacity (charging ratio) of at least 50%, most desirably 100% (i.e., full charge), of the full-charged capacity.

This charging ratio can be converted into voltage. When the voltage at the full charge is about 4.2 V, for example, the voltage at 50% charge is 3.7 V. Namely, the charging capacity can be determined by measuring the voltage of the electrodes 3, 4 (preferably the positive electrode 3).

Thereafter, thus preliminarily charged lithium-ion secondary battery 1 is annealed under a high-temperature condition of preferably at least 60° C., more preferably at least 70° C., further preferably at least 80° C. Though the upper limit of the temperature is not restricted in particular, it is preferred that the heating at a temperature of 100° C. or higher be avoided, since physical properties and chemical structures of the electrodes 3, 4 may change because of a reaction occurring between a solid electrolyte interface (SEI) formed on the negative electrode 4 side and the liquid electrolyte, and the like although depending on the annealing time (process time), whereby the upper limit of the annealing time is preferably 90° C. The annealing time is preferably at least 4 hours, at least 5 hours in particular. When the annealing time exceeds 24 hours, the annealing effect tends to be saturated, whereby further improvement is less likely to be expected.

It is verified that the preliminary charged lithium-ion secondary battery 1 subjected to such annealing, then caused to carry out several cycles of charging/discharging, and thereafter held in the full-charge state again for 4 hours at 90° C. exhibits an impedance change ratio of 125% or less, and a voltage keeping ratio of at least 98.5%.

On the other hand, it is verified that, without such preliminary charging and annealing, the same processing yields an impedance change ratio greater than 125% and a voltage keeping ratio lower than 98.5%.

Here, the "impedance change ratio (%)" is expressed by the impedance after holding in the full-charge state for 4 hours at 90° C./the impedance before processing at 90° C.×100. The value determined by AC method at a frequency of 1 kHz is used as the impedance in this case. The "voltage keeping ratio (%)" can also be determined by using a similar relationship. Namely, the "voltage keeping ratio (%)" is expressed by the voltage after holding in the full-charge state for 4 hours at 90° C./the voltage before processing at 90° C.×100.

Though a gas may occur upon annealing, an out gassing operation may be carried out if necessary when such a gas generation is seen. The out gassing may be carried out by opening apart of the outer package 2 of the lithium-ion secondary battery 1.

When the outer package 2 is a bag, for example, it will be sufficient if the opening part of the outer package 2 is not completely sealed before carrying out the annealing, so as to expel generated gases through the opening part, and the outer package 2 is completely sealed after completing the annealing. Alternatively, a hole may be formed in a part of the outer package 2 with a needle or the like. Known methods can be used for forming such a hole. For example, techniques disclosed in Japanese Patent Application Laid-Open No. 2000-353497 and Japanese Patent Application Laid-Open No. 2001-93580 can be employed.

In the case where the outer package 2 is a metal can, a part of the outer package 2 maybe temporarily closed (temporarily sealed), and this temporarily closed part may be opened when a gas is seen to occur.

It is verified that thus annealed lithium-ion secondary battery 1 of the present invention can quite effectively suppress the inflating phenomenon in a high-temperature environment.

Upon the annealing, the lithium-ion secondary battery 1 is required to be charged so as to approach the full-charge state as much as possible as mentioned above. This is considered to be because of the fact that keeping a highly reactive state within the battery by providing a significant amount of lithium ions in the electrode is effective in intentionally accelerating the deactivation of the above-mentioned active points in the positive electrode active material. However, operations are not limited thereto.

It is found that the lithium-ion secondary battery 1 made by using a liquid electrolyte including a chain carbonate having a low viscosity in its solvent fully eliminates the inflating phenomenon during high-temperature storage in a similar manner. This point also suggests that the deactivation of active points in the positive electrode active material is accelerated, whereby the gas generation is suppressed.

Lithium-Ion Secondary Battery Unit

Figure 3:
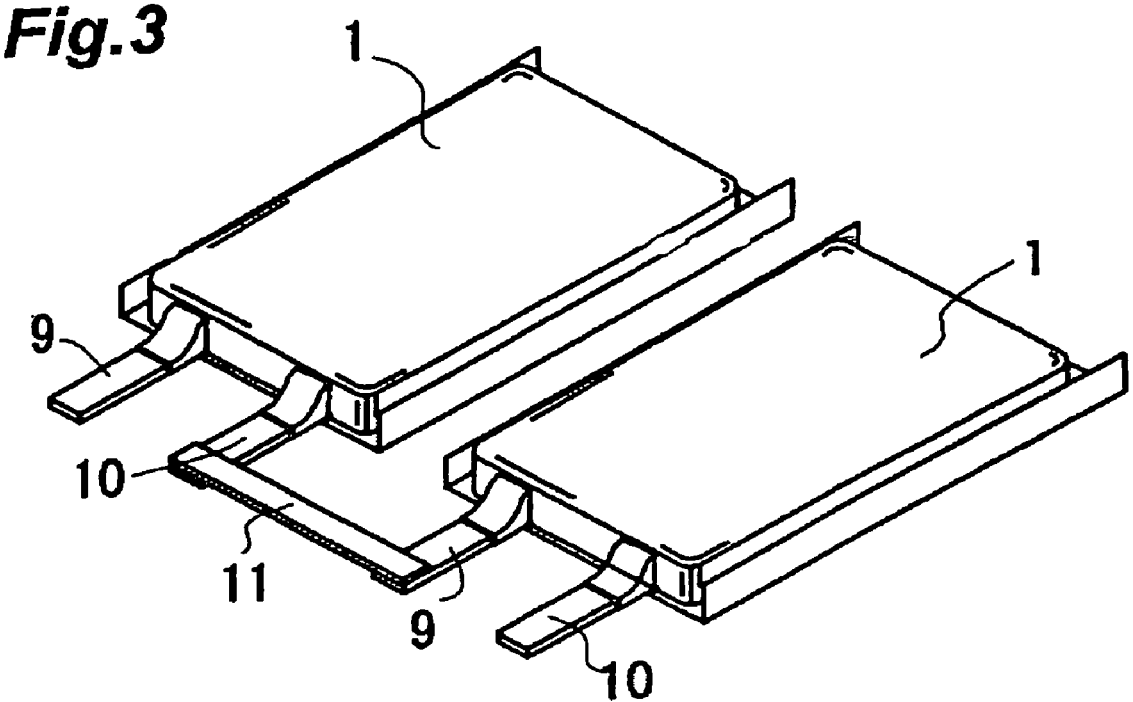
FIG. 3 is a perspective view schematically showing the configuration of another embodiment of the lithium-ion secondary battery in accordance with the present invention.

A unit formed by a plurality of lithium-ion secondary batteries in accordance with the present invention will now be explained as another embodiment thereof. The lithium-ion secondary battery unit (lithium-ion secondary battery of the present invention) shown in FIG. 3 mentioned above is the most preferable mode for higher voltage, in which a plurality of (two in this drawing) the lithium-ion secondary batteries 1 shown in FIG. 2 are connected in series to form a unit.

These lithium-ion secondary batteries 1, 1 are connected in series, for example, when a positive electrode terminal 9, a negative electrode terminal 10, and a metal strip 11 are connected together.

Depending on the mode or form of the lithium-ion secondary battery 1, a plurality of lithium-ion secondary batteries 1 may be laminated and packaged, so as to form a lithium-ion secondary battery unit.

Since thus configured lithium-ion secondary battery unit comprises the lithium-ion secondary battery 1 of the present invention as a constituent, its safety at a high-charge state is high, whereas the generation of lithium dendorite during charging/discharging cycles is very small. Therefore, even when connected in series, a part of the lithium-ion secondary batteries 1 can be kept from disadvantageously attaining an overcharged state because of fluctuations in characteristics of the individual lithium-ion secondary batteries 1. Hence, the unit as a whole can fully prevent its characteristics and safety from deteriorating.

EXAMPLES

In the following, specific examples in accordance with the present invention will be explained, which do not restrict the present invention.

Example 1

Preparation of Positive Electrode
A complex oxide represented by:

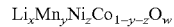

where x=1, y=0.30, z=0.55, and w=2 was used (90 parts by weight) as a positive electrode active material, whereas carbon black (6 parts by weight) as a conductance enhancer, and polyvinylidene fluoride, i.e., PVDF (4 parts by weight) as a binder were mixed therewith, and N-methyl-2-pyrrrolidone was dispersed therein as a solvent, so as to yield slurry. Subsequently, this slurry was applied onto an aluminum foil acting as a collector, dried, and subjected to rolling, so as to yield a positive electrode.

The crystal structure of this complex metal oxide was analyzed by X-ray diffraction, and was verified as a halite type. The BET specific surface area of the complex metal oxide was measured and found to be 0.55 m² µg, whereas its average particle size was 12 µm.

Preparation of Negative Electrode

Synthetic graphite (92 parts by weight) as a negative electrode active material was mixed with polyvinylidene fluoride, i.e., PVDF (8 parts by weight) as a binder, and N-methyl-2-pyrrrolidone was dispersed therein as a solvent, so as to yield slurry. Subsequently, this slurry was applied to an electrolytic copper foil, which was a collector, by doctor blading, and then was dried at 110° C. Thus dried product was subjected to rolling, so as to yield a negative electrode.

Preparation of Liquid Electrolyte

Employed as a liquid electrolyte was a nonaqueous liquid electrolyte whose solvent was a mixed solution in which EC/DEC=3/7 by volume ratio, and whose solute was a lithium salt, which was an electrolyte, at a ratio of 1 mol/L (dm 3).

Making of Lithium-ion Secondary Battery

The above-mentioned positive and negative electrodes were laminated by way of a separator and formed into a cell, into which the above-mentioned liquid electrolyte was injected, so as to yield a lithium-ion secondary battery in accordance with the present invention.

Example 2

A lithium-ion secondary battery was obtained as in Example 1 except that a complex oxide represented by:

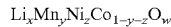

where x=1, y=0.41, z=0.42, and w=2 was used as the positive electrode active material.

The crystal structure of this complex metal oxide was analyzed by X-ray diffraction, and was verified as a halite type. The BET specific surface area was 0.60 m²/g, whereas its average particle size was 7.6 µm.

Example 3

A lithium-ion secondary battery was obtained as in Example 1 except that a complex oxide represented by:

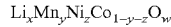

where x=1, y=0.33, z=0.33, and w=2 was used as the positive electrode active material.

The crystal structure of this complex metal oxide was analyzed by X-ray diffraction, and was verified as a halite type. Thus obtained X-ray diffraction spectrum is shown as curve Li in FIG. 5. The BET specific surface area was 0.79 m²/g, whereas its average particle size was 9.5 µm.

Example 4

A lithium-ion secondary battery was obtained as in Example 1 except that a complex oxide represented by:

where x=1, y=0.10, z=0.55, and w=2 was used as the positive electrode active material.

The crystal structure of this complex metal oxide was analyzed by X-ray diffraction, and was verified as a halite type. The BET specific surface area was 0.71 m²/g, whereas its average particle size was 11 µm.

Comparative Example 1

A lithium-ion secondary battery was obtained as in Example 1 except that lithium cobalt oxide ($LiCoO_2$) was used as the positive electrode active material.

The crystal structure of this complex metal oxide was analyzed by X-ray diffraction, and was verified as a halite type. The BET specific surface area was 0.48 m²/g, whereas its average particle size was 7.5 µm.

Comparative Example 2

A lithium-ion secondary battery was obtained as in Example 1 except that lithium manganese oxide ($LiMn_2O_4$) was used as the positive electrode active material.

The crystal structure of this complex metal oxide was analyzed by X-ray diffraction, and was verified as a spinel type. Thus obtained X-ray diffraction spectrum is shown as curve L2 in FIG. 5. The BET specific surface area was 0.70 m²/g, whereas its average particle size was 11.5 µm.

Comparative Example 3

A lithium-ion secondary battery was obtained as in Example 1 except that a complex oxide represented by:

where x=0.5, y=0.75, z=0.25, and w=2 (i.e., not including Co) was used as the positive electrode active material.

The crystal structure of this complex metal oxide was analyzed by X-ray diffraction, and was verified as a spinel type. The BET specific surface area was 3.6 m²/g, whereas its average particle size was 3.5 µm.

Characteristic Evaluation 1

The discharge capacity per 1 g of the positive electrode active material (at the time of 0.2 C discharge) was measured in each of the lithium-ion secondary batteries obtained by Examples 1 to 4 and Comparative Examples 1 to 3. Table 1 shows the results.

Also, each of the lithium-ion secondary batteries obtained by Examples 1 to 4 and Comparative Examples 1 to 3 was stored at 60° C. for 7 days in the state where the potential of the positive electrode with reference to lithium metal was 4.3 V (the battery voltage was 4.2 V since the negative electrode exhibited a potential of about 0.1 V with reference to lithium metal in this state), then its 1 C discharge at 25° C. capacity was measured, and the 1 C capacity recovery ratio before and after the high-temperature storage was evaluated. Table 2 shows the results.

TABLE 1

| Sample | x | y | z | w | Capacity (mAh/g) |
|---|---|---|---|---|---|
| Ex. 1 | 1.0 | 0.3 | 0.55 | 2 | 153 |
| Ex. 2 | 1.0 | 0.42 | 0.42 | 2 | 150 |
| Ex. 3 | 1.0 | 0.33 | 0.33 | 2 | 155 |
| Ex. 4 | 1.0 | 0.10 | 0.55 | 2 | 154 |
| Comp. Ex. 1 | — | — | — | — | 150 |
| Comp. Ex. 2 | — | — | — | — | 108 |
| Comp. Ex. 3 | 0.5 | 0.75 | 0.25 | 2 | 101 |

TABLE 2

| Sample | x | y | z | w | 1C capacity recovery ratio (%) |
|---|---|---|---|---|---|
| Ex. 1 | 1.0 | 0.3 | 0.55 | 2 | 99.6 |
| Ex. 2 | 1.0 | 0.42 | 0.42 | 2 | 99.9 |
| Ex. 3 | 1.0 | 0.33 | 0.33 | 2 | 100 |
| Ex. 4 | 1.0 | 0.10 | 0.55 | 2 | 99.8 |
| Comp. Ex. 1 | — | — | — | — | 94.5 |
| Comp. Ex. 2 | — | — | — | — | 90.9 |
| Comp. Ex. 3 | 0.5 | 0.75 | 0.25 | 2 | 88.1 |

It is seen from Tables 1 and 2 that the lithium-ion secondary batteries of Examples 1 to 4 in accordance with the present invention are superior to those of Comparative Examples 1 to 3 in terms of the discharge capacity per 1 g of the active material and 1 C capacity recovery ratio.

Example 6

Preparation of Positive Electrode
A complex oxide represented by:

$$Li_xMn_yNi_zCo_{1-y-z}O_w$$

where x=1, y=0.30, z=0.55, and w=2 was used (90 parts by weight) as a positive electrode active material, whereas carbon black (6 parts by weight) as a conductance enhancer, and polyvinylidene fluoride, i.e., PVDF (4 parts by weight) as a binder were mixed therewith, and N-methyl-2-pyrrrolidone was dispersed therein as a solvent, so as to yield slurry. Subsequently, this slurry was applied onto an aluminum foil acting as a collector, dried, and subjected to rolling, so as to yield a positive electrode.

The crystal structure of this complex metal oxide was analyzed by X-ray diffraction, and was verified as a halite type. The BET specific surface area of the complex metal oxide was measured and found to be 0.55 m²/g, whereas its average particle size was 12 μm.

Preparation of Negative Electrode
Synthetic graphite (92 parts by weight) as a negative electrode active material was mixed with polyvinylidene fluoride, i.e., PVDF (8 parts by weight) as a binder, and N-methyl-2-pyrrrolidone was dispersed therein as a solvent, so as to yield slurry. Subsequently, this slurry was applied to an electrolytic copper foil, which was a collector, by doctor blading, and then was dried at 110° C. Thus dried product was subjected to rolling, so as to yield a negative electrode.

Preparation of Liquid Electrolyte
Employed as a liquid electrolyte was a nonaqueous liquid electrolyte whose solvent was a mixed solution in which EC/DEC=3/7 by volume ratio, and whose solute was $LiPF_6$ as a lithium salt, which was an electrolyte, at a ratio of 1 mol/L (dm 3).

Making of Lithium-Ion Secondary Battery
The above-mentioned positive and negative electrodes were laminated by way of a separator and formed into a cell, which was then accommodated within an outer package made of an aluminum laminate film having a thickness of 0.2 mm, into which the above-mentioned liquid electrolyte was injected, so as to yield a lithium-ion secondary battery in accordance with the present invention. Here, used as the outer package was one shaped into a so-called deep drawn form.

Subsequently, this lithium-ion secondary battery in the uncharged state was charged (full-charged) to a state where the positive electrode attained a potential of 4.3V with reference to lithium metal, i.e., to the charging ratio of 100%, and was annealed at 90° C. for 4 hours.

Example 7

A lithium-ion secondary battery was obtained as in Example 6 except that a complex oxide represented by.

$$Li_xMn_yNi_zCo_{1-y-z}O_w$$

where x=1, y=0.42, and z=0.42 was used as the positive electrode active material.

Example 8

A lithium-ion secondary battery was obtained as in Example 6 except that a complex oxide represented by:

$$Li_xMn_yNi_zCo_{1-y-z}O_w$$

where x=1, y=0.33, and z=0.33 was used as the positive electrode active material.

Example 9

A lithium-ion secondary battery was obtained as in Example 6 except that annealing was carried out at a charging ratio of 50%.

Example 10

A lithium-ion secondary battery was obtained as in Example 8 except that annealing was carried out at a charging ratio of 50%.

Example 11

A lithium-ion secondary battery was obtained as in Example 6 except that annealing was carried out at a charging ratio of 100% at 60° C. for 1 day.

Example 12

A lithium-ion secondary battery was obtained as in Example 8 except that annealing was carried out at a charging ratio of 25%.

Example 13

A lithium-ion secondary battery was obtained as in Example 8 except that annealing was carried out at a charging ratio of 0% (i.e., without preliminary charging).

Example 14

A lithium-ion secondary battery was obtained as in Example 6 except that annealing was carried out for 3 hours.

Comparative Example 4

A lithium-ion secondary battery was obtained as in Example 6 except that lithium cobalt oxide ($LiCoO_2$) was used as the positive electrode active material.

Characteristic Evaluation 2
The impedance and voltage of each of the lithium-ion secondary batteries obtained by Examples 6 to 14 and Comparative Example 4 were measured when fully charged after being subjected to a charging/discharging cycle. Thereafter, the impedance, voltage, and thickness of each battery held in the full-charged state at 90° C. for 4 hours were measured, and their change ratios (the increase ratio for thickness) were calculated from the measured values.

For the impedance, the values at 1 kHz obtained by AC method were used as in the explanation of the above-mentioned embodiment. The thickness increase ratio was evaluated as an index of the battery inflating phenomenon Table 3 shows the results of these characteristic evaluations.

TABLE 3

| Sample | Impedance change ratio (%) | Voltage keeping ratio (%) | Thickness increase ratio (%) |
| --- | --- | --- | --- |
| Ex. 6 | 110 | 98.9 | 3.3 |
| Ex. 7 | 108 | 98.8 | 2.8 |
| Ex. 8 | 111 | 98.8 | 2.2 |
| Ex. 9 | 120 | 98.7 | 3.5 |
| Ex. 10 | 115 | 98.7 | 3.3 |
| Ex. 11 | 138 | 97.1 | 4.9 |
| Ex. 12 | 150 | 97.1 | 5.5 |
| Ex. 13 | 135 | 97.3 | 3.8 |
| Ex. 14 | 148 | 98.1 | 10.3 |
| Comp. Ex. 4 | 130 | 98.0 | 3.3 |

These results verify that the lithium-ion secondary batteries of Examples 6 to 10 significantly restrain the inflating phenomenon from occurring as compared with Examples 11 to 14. It is also verified that the lithium-ion secondary battery of Comparative Example 4 exhibits a thickness increase ratio substantially on a par with those of Examples 6, 9, and 10, whereas its impedance change ratio and voltage keeping ratio are slightly lower than those of Examples 6 to 10.

Characteristic Evaluation 3

In each of the lithium-ion secondary batteries obtained by Examples 6 to 14 and Comparative Example 4, the capacity was measured before and after annealing, and after 10 cycles of charging/discharging at 1 C. Using these measured values, the capacity change ratio between before and after annealing and the capacity keeping ratio after 10 cycles at 1 C after annealing were calculated. Table 4 shows the results.

TABLE 4

| Sample | Capacity change ratio upon annealing (%) | Capacity keeping ratio upon 1C-10 cycles after annealing (%) |
| --- | --- | --- |
| Ex. 6 | 99.5 | 99.3 |
| Ex. 7 | 99.3 | 99.9 |
| Ex. 8 | 99.5 | 99.7 |
| Ex. 9 | 99.1 | 99.0 |
| Ex. 10 | 99.7 | 99.5 |
| Ex. 11 | 99.5 | 99.5 |
| Ex. 12 | 99.7 | 99.3 |
| Ex. 13 | 99.0 | 99.5 |
| Ex. 14 | 99.5 | 99.7 |
| Comp. Ex. 4 | 88.5 | 99.2 |

These results show that the lithium-ion secondary battery of Comparative Example 4 tends to yield a greater capacity change ratio and a slightly lower capacity keeping ratio after a plurality of charging/discharging cycles as compared with Examples 6 to 14. This seems to be because of a characteristic deterioration caused by high-temperature annealing.

Example 15

Preparation of Positive Electrode $LiMn_{0.33}Ni_{0.33}CO_{0.34}O_2$ was used (90 parts by weight) as a positive electrode active material, whereas acetylene black (6 parts by weight) as a conductance enhancer, and polyvinylidene fluoride, i.e., PVDF (4 parts by weight) as a binder were mixed therewith, and they were mixed and dispersed by a planetary mixer. Then, an appropriate amount of N-methyl-2-pyrrrolidone (NMP) was added thereto so as to adjust the viscosity, whereby a slurry-like coating liquid was obtained.

Subsequently, this coating liquid was applied onto an aluminum foil (having a thickness of 20 μm) as a collector by doctor blading such that the positive electrode active material carrying amount became 26.5 mg/cm$^2$, and dried. This collector was pressed by a calender roll such that the positive electrode active material attained a porosity of 28%, and then punched into a size of 18 mm×34.5 mm, whereby a positive electrode was obtained. A part of the positive electrode was extended like a ribbon, so as to form a positive electrode connecting terminal.

Preparation of Negative Electrode

Synthetic graphite (92 parts by weight) as a negative electrode active material was mixed and dispersed with polyvinylidene fluoride, i.e., PVDF (8 parts by weight) as a binder by a planetary mixer, and then the viscosity of the mixture was adjusted by an appropriate amount of NMP, so as to yield a slurry-like coating liquid.

Subsequently, this coating liquid was applied onto a copper foil (having a thickness of 15 μm) as a collector by doctor blading such that the negative electrode active material carrying amount became 14.0 mg/cm$^2$, and dried. This collector was pressed by a calender roll such that the positive electrode active material attained a porosity of 30%, and then punched into a size of 18 mm×34.5 mm, whereby a negative electrode was obtained. A part of the positive electrode was extended like a ribbon, so as to form a negative electrode connecting terminal.

Forming of Electrode Group

A polyolefin separator punched into a size of 119×36 mm (having a thickness of 25 μm with a Gurley air permeation time of 100 seconds) was held between the positive and negative electrodes, and both edges were heat-sealed under pressure, whereby an electrode group was obtained.

Preparation of Liquid Electrolyte

Ethylene carbonate (EC), diethyl carbonate (DEC), and ethyl methyl carbonate (EMC), which were nonaqueous electrolyte solvents, were mixed, whereby a mixed solvent was obtained. The mixing ratio of this mixed solvent was EC/DEC/EMC=30/30/40 (volume ratio). $LiPF_6$ as a lithium salt which was an electrolyte was added to the mixed solvent, so as to yield a salt concentration of 1.5 mol/L. Further, 1,3-propane sultone was added to thus obtained solution by 3 wt % with respect to the whole liquid.

Making of Lithium-ion Secondary Battery

The above-mentioned electrode group was accommodated in an outer package made of a bag-like aluminum laminate film. Subsequently, while thus obtained product was held under a reduced pressure in a vacuum chamber, the above-mentioned liquid electrolyte was injected into the outer package, so as to immerse the electrode group into the liquid electrolyte. After the liquid electrolyte immersion was completed, the unsealed part of the outer package was sealed still under the reduced pressure, whereby a laminate type lithium-ion secondary battery in an uncharged state was obtained.

Next, this uncharged lithium-ion secondary battery was charged (full-charged) to the state where the positive electrode attained a potential of 4.3 V with reference to lithium metal, i.e., a charging ratio of 100%, and then was annealed at 90° C. for 5 hours. Thereafter, the gas generated during storage was purged by out gassing in vacuum, whereby a lithium-ion secondary battery having an outer size of 20 mm (width)× 43 mm (height)×3 mm (thickness) was obtained.

Examples 16 to 19

Laminate type lithium-ion secondary batteries were obtained as in Example 15 except that 1,3-propane sultone was added to the whole liquid electrolyte by 0.5 wt % (Example 16), 1.0 wt % (Example 17), 5.0 wt % (Example 18), and 7.0 wt % (Example 19), respectively.

Examples 20 to 26

Laminate type lithium-ion secondary batteries were obtained as in Example 15 except that liquid electrolytes with a mixed solvent of DEC, EMC, and EC in which EC was added to DEC/EMC=50/50 (volume ratio) by 5 vol % (Example 20), 10 vol % (Example 21), 20 vol % (Example 22), 30 vol % (Example 23), 40 vol % (Example 24), 50 vol % (Example 25), and 60 vol % (Example 26) with respect to the whole mixed solvent were used.

Examples 27 to 31

Laminate type lithium-ion secondary batteries were obtained as in Example 15 except that liquid electrolytes in which, while the volume ratio of EC was fixed at 30 vol % in a mixed solvent of EC, DEC, and EMC, the volume ratio of EMC was 10 vol % (Example 27), 20 vol % (Example 28), 30 vol % (Example 29), 50 vol % (Example 30), and 60 vol % (Example 31) were used.

Examples 32 to 35

Laminate type lithium-ion secondary batteries were obtained as in Example 15 except that liquid electrolytes in which, while the volume ratio of EC was fixed at 30 vol % in a mixed solvent of EC, DEC, and dimethyl carbonate (DMC), the volume ratio of DMC was 20 vol % (Example 32), 30 vol % (Example 33), 40 vol % (Example 34), and 60 vol % (Example 35) were used.

Example 36

A laminate type lithium-ion secondary battery was obtained as in Example 15 except that a liquid electrolyte having a mixed solvent composition of EC/DEC=30/70 vol % was used.

Example 37

A laminate type lithium-ion secondary battery was obtained as in Example 15 except that no annealing was carried out.

Comparative Example 5

A laminate type lithium-ion secondary battery was obtained as in Example 15 except that lithium cobalt oxide ($LiCoO_2$) was used as the positive electrode active material.

Example 6

A laminate type lithium-ion secondary battery was obtained as in Comparative Example 5 except that no annealing was carried out.

Example 38

A laminate type lithium-ion secondary battery was obtained as in Example 15 except that a liquid electrolyte having a mixed solvent composition of EC/EMC=30/70 vol % was used.

Characteristic Evaluation 4

After various characteristics of the lithium-ion secondary batteries obtained by Examples 15 to 38 and Comparative Examples 5, 6 were evaluated, a high-temperature storage test at 90° C. for 5 hours with a charging ratio of 100% was carried out, and battery characteristics and the thickness increase ratio as an index of the inflating phenomenon as mentioned above were evaluated. Various evaluation conditions and results will now be explained.

It is verified that the laminate type lithium-ion secondary battery obtained by Example 15 exhibits a small thickness increase, a high discharge capacity, and a favorable capacity keeping ratio.

It is verified that the laminate type lithium-ion secondary batteries obtained by Examples 17 and 18 show no substantial increase in thickness, while exhibiting a high discharge characteristic.

While the laminate type lithium-ion secondary battery obtained by Example 16 exhibits a high discharge characteristic, it is seen to increase its thickness because of a gas generation.

Though the laminate type lithium-ion secondary battery obtained by Example 19 hardly increases its thickness, its battery characteristics tends to be inferior to those of Example 15.

The laminate type lithium-ion secondary batteries obtained by Examples 20 to 26 exhibit no substantial increase in thickness when stored at a high temperature. The laminate type lithium-ion secondary batteries of Examples 20 and 26 tend to exhibit battery characteristics inferior to those of Examples 15 and 21 to 24.

The laminate type lithium-ion secondary batteries obtained by Examples 27 to 30 show no substantial increase in thickness when stored at a high temperature, while exhibiting excellent battery characteristics. Though the laminate type lithium-ion secondary battery obtained by Example 31 exhibits excellent battery characteristics, its thickness is seen to increase because of a gas generation.

The laminate type lithium-ion secondary batteries obtained by Examples 32 and 33 show no substantial increase in thickness when stored at a high temperature, while exhibiting excellent battery characteristics. Though the laminate type lithium-ion secondary batteries obtained by Examples 34 and 35 exhibit excellent battery characteristics, their thickness is seen to increase because of a gas generation.

It is verified that the laminate type lithium-ion secondary battery obtained by Example 36 exhibits a small amount of increase in thickness and relatively inferior battery characteristics.

It is verified that the laminate type lithium-ion secondary battery obtained by Example 37 has excellent battery characteristics and exhibits a relatively large amount of increase in thickness.

The laminate type lithium-ion secondary battery obtained by Comparative Example 5 is found to be inferior in high-temperature storage characteristics and battery characteristics.

The laminate type lithium-ion secondary battery obtained by Comparative Example 6 is found to yield a significantly large amount of increase in thickness because of a gas generation, and exhibit inferior high-temperature storage characteristics and battery characteristics.

It is verified that the laminate type lithium-ion secondary battery obtained by Example 38 is excellent in battery characteristics, whereas its amount of increase in thickness is relatively large Studies on Solvent Composition and Positive Electrode Active Material shows battery characteristics and battery thickness increase ratios after a high-temperature storage test at 90° C. for 5 hours in a full-charged state of the lithium-ion secondary batteries obtained by Examples 15 and 36.

When the results of Examples 15 and 37 are compared with each other, it is seen that the annealing before the high-temperature storage test is effective in suppressing the increase in battery thickness. This seems to suggest that the annealing of the present invention exhibits an effect of restraining gases from being generated at the time of high-temperature storage.

When Example 15 and Comparative Examples 5 and 6 are compared with each other, a difference in annealing effects caused by a difference in positive electrode active materials, i.e., that the effects are remarkably enhanced when the positive electrode active material of Example 15 is used, is seen. Specifically, Comparative Example 5 exhibits a capacity deterioration at the time of initial annealing, though the annealing can suppress the battery swelling. Also, its rate

TABLE 5

| | Liquid electrolyte solvent composition | | | | Before high-temperature storage test | | | After high-temperature storage test | |
|---|---|---|---|---|---|---|---|---|---|
| Sample | EC (vol %) | DEC (vol %) | EMC (vol %) | 1,3-propane sultone (wt %) | 1C capacity (mAh) | Rate characteristic 2C/0.5C (%) | Temperature characteristic −20° C./25° C. (%) | 1C capacity (mAh) | Thickness increase ratio (%) |
| Ex. 15 | 30 | 30 | 40 | 3.0 | 194 | 68.8 | 21.5 | 194 | 3.6 |
| Ex. 36 | 30 | 70 | 0 | 3.0 | 191 | 58.8 | 1.9 | 190 | 2.9 |

These results verify that the rate characteristic and temperature characteristic can greatly be improved when DEC in the mixed solvent is partly substituted by EMC having a lower viscosity and a higher conductivity.

It is also found that, even when a low-viscosity solvent generating a gas at a high temperature, such as EMC, is added to the mixed solvent, the annealing of the present invention carried out beforehand restrains the gas from being generated, whereby a battery having favorable characteristics is obtained. This seems to support the presumption that the suppression of a gas generation by annealing results from the fact that active points for generating a gas in the positive electrode are deactivated when the positive electrode is caused to react with the liquid electrolyte beforehand.

Table 6 shows battery characteristics, and capacities and thickness increase ratios after a high-temperature storage test at 90° C. for 5 hours in a full-charged state of the lithium-ion secondary batteries obtained by Examples 15 and 37 and Comparative Examples 5 and 6.

characteristic, temperature characteristic, and cycle characteristic are inferior to those of Example 15. On the other hand, though no great decrease in 1 C capacity occurs in Comparative Example 6 (which is assumed to be because no annealing was carried out), its thickness increase ratio caused by a gas generation is more prominent than that in Example 15.

These verify that using the positive electrode active material in accordance with the present invention and further carrying out the annealing employed in the present invention can reliably restrain gases from occurring at the time of high-temperature storage and keep excellent battery characteristics.

Studies on Doping Amount of 1,3-Propane Sultone

Table 7 shows battery characteristics before and after a high-temperature storage test at 90° C. for 5 hours in a full-charged state of the lithium-ion secondary batteries obtained by Examples 15 to 19, and their battery thickness increase ratios.

TABLE 6

| | | | Before high-temperature storage test | | | | After high-temperature storage test | |
|---|---|---|---|---|---|---|---|---|
| Sample | Positive electrode active material | Annealing | 1C capacity (mAh) | 1 kHz impedance (mΩ) | Rate characteristic 2C/0.5C (%) | Temperature characteristic −20° C./25° C. (%) | 1C capacity (mAh) | Thickness increase ratio (%) |
| Ex. 15 | LiMn$_{0.33}$ Ni$_{0.33}$ Co$_{0.34}$O$_2$ | Yes | 194 | 158.9 | 68.8 | 21.5 | 194 | 3.6 |
| Ex. 37 | | No | 193 | 146.4 | 69.6 | 20.9 | 192 | 17.3 |
| Ex. 5 | LiCoO$_2$ | Yes | 177 | 195.1 | 62.3 | 4.2 | 168 | 3.5 |
| Ex. 6 | | No | 188 | 153.4 | 73.3 | 6.6 | 178 | 9.6 |

TABLE 7

| Sample | 1,3-propane sultone (wt %) | Before high-temperature storage test | | | After high-temperature storage test | |
|---|---|---|---|---|---|---|
| | | 1C capacity (mAh) | Rate characteristic 2C/0.5C (%) | Temperature characteristic −20° C./25° C. (%) | 1C capacity (mAh) | Thickness increase ratio (%) |
| Ex. 16 | 0.5 | 192 | 69.8 | 22.3 | 191 | 7.6 |
| Ex. 17 | 1.0 | 195 | 69.6 | 21.8 | 194 | 4.3 |
| Ex. 15 | 3.0 | 194 | 68.8 | 21.5 | 194 | 3.6 |
| Ex. 18 | 5.0 | 189 | 59.6 | 13.6 | 188 | 2.9 |
| Ex. 19 | 7.0 | 176 | 46.7 | 2.8 | 172 | 2.6 |

When the results or Examples 15 to 19 are compared with each other, it is found that a preferable range exists in the doping amount of 1,3-propane sultone. For example, when the doping amount of 1,3-propane sultone is raised to about 7 wt %, IC capacity, rate characteristic, and low-temperature characteristic tend to deteriorate. When the doping amount is lowered to about 0.5 wt %, on the other hand, the increase in battery thickness caused by a gas generation tends to become remarkable.

These results suggest that the addition of 1,3-propane sultone forms a stable coating on the negative electrode surface, which suppresses the reaction between the negative electrode and the liquid electrolyte at the time of high-temperature storage, thereby lowering the amount of gas generated. However, as mentioned above, an excessive increase in the doping amount of 1,3-propane sultone may increase the viscosity of the liquid electrolyte, so that the lithium ion conductivity may become too low, thus deteriorating battery characteristics. These facts verify that 1,3-propane sultone added within the range of 1 to 5 wt % can improve battery characteristics and suppress the gas generation at the same time.

Studies on EC Composition

As mentioned above, FIG. 4 is a graph showing changes in the 2 C discharge capacity, −20° C. discharge capacity, and 1 kHz impedance in the lithium-ion secondary batteries obtained by Examples 20 to 26 with respect to the ratio of EC (the ratio of volume content in the mixed solvent, i.e., vol %).

In the graph, the black square (■), whitened circle (○), and black diamond (♦) indicate respective measured values of 2 C discharge capacity, −20° C. discharge capacity, and 1 kHz impedance, whereas respective curves drawn so as to correspond to these symbols are guidelines for their changes.

Figure 4:
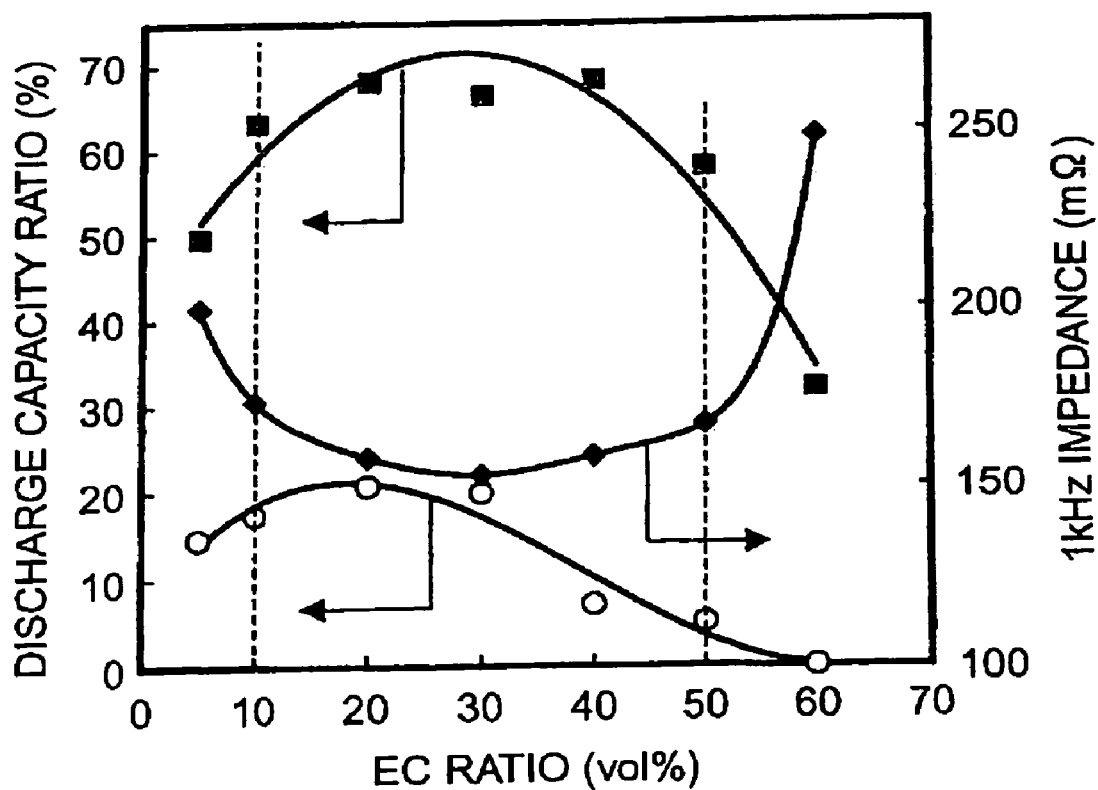
FIG. 4 is a graph showing changes in the 2 C discharge capacity, −20° C. discharge capacity, and 1 kHz impedance with respect to the ratio of EC (the ratio of volume content in the mixed solvent, i.e., vol %) in the lithium-ion secondary batteries obtained by Examples 20 to 26.

From FIG. 4, it is seen that the impedance increases as the ratio of EC becomes greater or smaller than about 30 vol %, and the 2 C discharge capacity tends to decrease therewith. This is presumed to be because an increase in the ratio of EC, which is a cyclic carbonate, raises the viscosity of the liquid electrolyte, thereby yielding a higher impedance; whereas a decrease in the ratio lowers the dielectric constant, so as to decrease the degree of dissociation of a lithium salt as an electrolyte salt, thereby raising the impedance.

The −20° C. discharge capacity is seen to exhibit substantially the same tendency as with the 2 C discharge capacity. The reason why not only the capacity decreases drastically when the ratio of EC rises, but also the capacity remarkably deteriorates when the ratio becomes too low seems to be the same as that mentioned above. The reason why the maximum value of capacity tends to shift to the lower ratio (lower concentration) side of EC seems to be because the mixed solvent yields a lower melting point as the ratio of EC is smaller. These results verify that the ratio of EC in the mixed solvent is preferably within the range of 10 to 50 vol %, the range of 20 to 30 vol % in particular.

Studies on EMC Composition

Table 8 shows battery characteristics of the lithium-ion secondary batteries obtained by Examples 15, 27 to 31, 36, and 38 and their battery thickness increase ratios after a high-temperature storage test at 90° C. for 5 hours in a full-charged state.

TABLE 8

| Sample | Liquid electrolyte Solvent composition | | | Before high-temperature storage test | | | After high-temperature storage test | |
|---|---|---|---|---|---|---|---|---|
| | EC (vol %) | DEC (vol %) | EMC (vol %) | 1C capacity (mAh) | Rate characteristic 2C/0.5C (%) | Temperature characteristic −20° C./25° C. (%) | 1C capacity (mAh) | Thickness increase ratio (%) |
| Ex. 36 | 30 | 70 | 0 | 191 | 58.5 | 1.9 | 190 | 2.9 |
| Ex. 27 | 30 | 60 | 10 | 192 | 62.7 | 9.9 | 192 | 3.4 |
| Ex. 28 | 30 | 50 | 20 | 191 | 66.2 | 17.5 | 190 | 3.0 |
| Ex. 29 | 30 | 40 | 30 | 191 | 68.7 | 19.8 | 191 | 2.8 |
| Ex. 15 | 30 | 30 | 40 | 194 | 68.8 | 21.5 | 194 | 3.6 |
| Ex. 30 | 30 | 20 | 50 | 192 | 69.3 | 22.1 | 192 | 4.7 |
| Ex. 31 | 30 | 10 | 60 | 193 | 72.0 | 22.6 | 193 | 8.2 |
| Ex. 38 | 30 | 0 | 70 | 194 | 76.3 | 25.0 | 193 | 10.3 |

Table 8 verifies that the rate characteristic and temperature characteristic improve as the ratio of EMC in the mixed solvent (the ratio of volume content in the mixed solvent, i.e., vol %) increases. However, the increase in battery thickness is seen to become relatively remarkable when the ratio of EMC exceeds about 50 vol %. This seems to be because of the fact that the increase in EMC ratio in the mixed solvent enhances the gas generation at the time of high-temperature storage. Hence, it is found useful if the ratio of EMC is 50 vol % or less.

Studies on DMC Composition

Table 9 shows battery characteristics of the lithium-ion secondary batteries obtained by Examples 32 to 36 and their battery thickness increase ratios after a high-temperature storage test at 90° C. for 5 hours in a full-charged state.

TABLE 9

| Sample | Liquid electrolyte solvent composition | | | Before high-temperature storage test | | | After high-temperature storage test | |
|---|---|---|---|---|---|---|---|---|
| | EC (vol %) | DEC (vol %) | DMC (vol %) | 1C capacity (mAh) | Rate characteristic 2C/0.5C (%) | Temperature characteristic −20° C./25° C. (%) | 1C capacity (mAh) | Thickness increase ratio (%) |
| Ex. 36 | 30 | 70 | 0 | 191 | 58.5 | 1.9 | 190 | 2.9 |
| Ex. 32 | 30 | 50 | 20 | 192 | 68.3 | 16.4 | 191 | 2.7 |
| Ex. 33 | 30 | 40 | 30 | 191 | 74.4 | 21.0 | 190 | 3.1 |
| Ex. 34 | 30 | 30 | 40 | 191 | 79.6 | 29.3 | 191 | 5.5 |
| Ex. 35 | 30 | 0 | 60 | 193 | 91.7 | 33.7 | 191 | 10.2 |

From Table 9, it is seen that the rate characteristic and low-temperature characteristic greatly improve even when DMC having a lower viscosity and a higher conductivity as compared with EMC is mixed. When DMC is used, the increase in battery thickness is harder to neglect if the ratio of DMC in the mixed solvent (the ratio of volume content in the mixed solvent, i.e., vol %) becomes about 40 vol % or greater. Hence, it is found useful if the ratio of DMC is 30 vol % or less.

Example 39

Preparation of Positive Electrode $LiMn_{0.33}Ni_{0.33}Co_{0.34}O_2$ was used (90 parts by weight) as a positive electrode active material, whereas acetylene black (6 parts by weight) as a conductance enhancer, and polyvinylidene fluoride, i.e., PVDF (4 parts by weight) as a binder were mixed therewith, and they were mixed and dispersed by a planetary mixer. Then, an appropriate amount of NMP was added thereto so as to adjust the viscosity, whereby a slurry-like coating liquid was obtained.

Subsequently, this coating liquid was applied onto an aluminum foil (having a thickness of 20 µm) as a collector by doctor blading, and dried. The positive electrode active material was applied to both surfaces of the collector. However, the coating liquid was applied to only one side each of two positive electrode collectors to become the outer most layers in an integrated structure. The collectors were pressed and then punched into a predetermined size, whereby a positive electrode was obtained.

Preparation of Negative Electrode

Synthetic graphite (92 parts by weight) as a negative electrode active material was mixed and dispersed with polyvinylidene fluoride, i.e., PVDF (8 parts by weight) as a binder by a planetary mixer, and then the viscosity of the mixture was adjusted by an appropriate amount of NMP added thereto, so as to yield a slurry-like coating-liquid.

Subsequently, this coating liquid was applied onto a copper foil (having a thickness of 15 µm) as a collector by doctor blading, and dried. The negative electrode active material was applied to both surfaces of each of all the negative electrode collectors. The collectors were pressed and then punched into a predetermined size, whereby a negative electrode was obtained.

Here, forms and sizes of the positive and negative electrodes can be determined arbitrarily in conformity to necessary design specs. In the preparation of each of positive and negative electrodes, an electrode connecting terminal was formed. The form and connection type of the connecting terminal can appropriately be chosen from various method such as those of types in which a lead wire is attached or a part of the electrode is extended. In this example, a part of the electrode was extended like a ribbon, so as to yield a connecting terminal.

Forming of Electrode Group

A separator punched into a specific size was held between the positive and negative electrodes similarly punched into a specific size, and both edges were heat-sealed under pressure, whereby an electrode group was obtained. A positive electrode having only one side coated with the positive electrode active material was used at a laminate end of the electrode group.

Preparation of Liquid Electrolyte

A mixed solvent was prepared by mixing ethylene carbonate (EC) and diethyl carbonate (DEC) at a volume ratio of 3:7, and $LiPF_6$ as an electrolyte salt was added thereto at a ratio of 1 mol/L (dm 3), whereby a liquid electrolyte was obtained.

Making of Lithium-ion Secondary Battery

The above-mentioned electrode group was accommodated in an outer package made of a bag-like aluminum laminate film. Subsequently, while thus obtained product was held under a reduced pressure in a vacuum chamber, the above-mentioned liquid electrolyte was injected into the outer package, so as to immerse the electrode group into the liquid electrolyte. After the liquid electrolyte immersion was completed, the unsealed part of the outer package was sealed still under the reduced pressure, whereby a single cell of laminate type lithium-ion secondary battery in an uncharged state was obtained. Two such single cells were connected in series so as to construct a secondary battery unit (lithium-ion secondary battery of the present invention), thus yielding a battery for evaluation.

Example 40

A single cell of laminate type lithium-ion secondary battery and a unitized battery for evaluation were obtained as in Example 39 except that $LiMn_{0.42}Ni_{0.42}Co_{0.16}O_2$ was used as the positive electrode active material.

Example 41

A single cell of laminate type lithium-ion secondary battery and a unitized battery for evaluation were obtained as in Example 39 except that $LiMn_{0.30}Ni_{0.55}Co_{0.15}O_2$ was used as the positive electrode active material.

Comparative Example 7

A single cell of laminate type lithium-ion secondary battery and a unitized battery for evaluation were obtained as in Example 39 except that lithium cobalt oxide ($LiCoO_2$) was used as the positive electrode active material.

Characteristic Evaluation 5

Characteristics of the single cell of lithium-ion secondary battery in an uncharged state obtained by Example 39 were evaluated with a charging upper limit voltage of 4.2 V and a discharging lower limit voltage of 2.5 V. The temperature at the time of evaluation was 23° C. As a result, the single cell exhibited a high discharge capacity of 220 mAh. After a test of 10 cycles as a cycle test, the single cell yielded a capacity keeping ratio of 99.8%.

Also, characteristics of the unitized battery for evaluation obtained by Example 39 were evaluated with a charging upper limit voltage of 8.4 V and a discharging lower limit voltage of 5.0 V. The temperature at the time of evaluation was 23° C. As a result, the battery for evaluation exhibited a discharge capacity of 218 mAh. After 100 cycles, this battery for evaluation yielded a capacity keeping ratio of 96.5%.

Further, in the manner mentioned above, the characteristic evaluation was carried out for the single cell and battery for evaluation obtained by Example 40. As a result, the single cell of Example 40 exhibited a discharge capacity of 220 mAh, and a capacity keeping ratio of 99.8% after a test of 10 cycles. The battery for evaluation exhibited a discharge capacity of 220 mAh, and a capacity keeping ratio of 95.9% after a test of 100 cycles.

Furthermore, in the manner mentioned above, the characteristic evaluation was carried out for the single cell and battery for evaluation obtained by Example 41. As a result, the single cell of Example 41 exhibited a discharge capacity of 225 mAh, and a capacity keeping ratio of 99.7% after a test of 10 cycles. The battery for evaluation exhibited a discharge capacity of 220 mAh, and a capacity keeping ratio of 95.8% after a test of 100 cycles.

These results verify that the laminate type lithium-ion secondary batteries obtained by Examples 39 to 41, either in the form of single cell or connected in series as a unitized battery for evaluation, exhibit high discharge capacities and favorable capacity keeping ratios.

Also, in the manner mentioned above, the characteristic evaluation was carried out for the single cell and battery for evaluation obtained by Comparative Example 7. As a result, the single cell of Comparative Example 7 exhibited a discharge capacity of 215 mAh, and a capacity keeping ratio of 99.3% after a test of 10 cycles. The battery for evaluation exhibited a discharge capacity of 215 mAh, and a capacity keeping ratio of 68.8% after a test of 100 cycles.

These results verify that, although the laminate type lithium-ion secondary battery obtained by Comparative Example 7 exhibits the discharge capacity and capacity keeping ratio on a par with those of Examples 39 to 41 as a single cell, both its discharge capacity and capacity keeping ratio decrease remarkably when connected in series to form a unit.

Table 10 shows the results of these cycle tests.

TABLE 10

| Sample | Single cell | | Battery for evaluation (2 single cells connected in series) | |
|---|---|---|---|---|
| | Discharge capacity (mAh) | Capacity keeping ratio (%) at 10 cycles | Discharge capacity (mAh) | Capacity keeping ratio (%) at 100 cycles |
| Ex. 39 | 220 | 99.8 | 218 | 96.5 |
| Ex. 40 | 220 | 99.8 | 220 | 95.9 |
| Ex. 41 | 225 | 99.7 | 220 | 95.8 |
| Comp. Ex. 7 | 215 | 99.3 | 215 | 68.8 |

Also, these show that the discharge capacity and capacity keeping ratio of the battery for evaluation are on a par with those of the single cell and favorable in each of Examples 39 to 41 using synthetic graphite as the negative electrode active material and an LiMnNiCo complex oxide having a predetermined composition ratio as the positive electrode active material.

By contrast, it is verified that characteristics of the battery for evaluation tend to decrease to an unpractical degree in Comparative Example 7 using lithium cobalt oxide as the positive electrode active material.

Thus, it is verified that the lithium-ion secondary battery of the present invention has a high discharge capacity and a favorable cycle characteristic even when used at a high voltage while being connected in series. This seems to show that characteristics of the lithium-ion secondary battery in accordance with the present invention are stable for a long period of time throughout charging/discharging cycles, thereby suggesting the safety of the lithium-ion secondary battery.

Example 42

Preparation of Positive Electrode $LiMn_{0.33}Ni_{0.33}CO_{0.33}O_2$ was used (90 parts by weight) as a positive electrode active material, whereas acetylene black (6 parts by weight) as a conductance enhancer, and polyvinylidene fluoride, i.e., PVDF (4 parts by weight) as a binder were mixed therewith, and they were mixed and dispersed by a planetary mixer. Then, an appropriate amount of NMP was added thereto so as to adjust the viscosity, whereby a slurry-like coating liquid was obtained.

Subsequently, this coating liquid was applied onto an aluminum foil (having a thickness of 20 μm) as a collector by doctor blading, and dried. The positive electrode active material was applied to both surfaces of the collector. However, the coating liquid was applied to only one side each of two positive electrode collectors to become the outermost layers in an integrated structure. The collectors were pressed and then punched into a predetermined size, whereby a positive electrode was obtained.

Preparation of Negative Electrode

While $Li_{1.33}Ti_{1.67}O_4$ (84 parts by weight) was used as a negative electrode active material, acetylene black (8 parts by weight) as a conductivity enhancer and polyvinylidene fluoride, i.e., PVDF (8 parts by weight) as a binder were mixed therewith. The resulting mixture was mixed and dispersed by a planetary mixer, and then the viscosity of the mixture was adjusted by an appropriate amount of NMP added thereto, so as to yield a slurry-like coating liquid.

Subsequently, this coating liquid was applied onto a copper foil (having a thickness of 15 μm) as a collector by doctor blading, and dried. The negative electrode active material was applied to both surfaces of each of all the negative electrode collectors. The collectors were pressed and then punched into a predetermined size, whereby a negative electrode was obtained.

Here, forms and sizes of the positive and negative electrodes can be determined arbitrarily in conformity to necessary design specs. In the preparation of each of positive and negative electrodes, an electrode connecting terminal was formed. The form and connection type of the connecting terminal can appropriately be chosen from various methods such as those of types in which a lead wire is attached or a part of the electrode is extended. In this example, a part of the electrode was extended like a ribbon, so as to yield a connecting terminal.

Forming of Electrode Group

A separator punched into a specific size was held between the positive and negative electrodes similarly punched into a specific size, and both edges were heat-sealed under pressure, whereby an electrode group was obtained. A positive electrode having only one side coated with the positive electrode active material was used at a laminate end of the electrode group.

Preparation of Liquid Electrolyte

A mixed solvent was prepared by mixing ethylene carbonate (EC) and diethylcarbonate (DEC) at a volume ratio of 3:7, and $LiPF_6$ as an electrolyte salt was added thereto at a ratio of 1 mol/L (dm 3), whereby a liquid electrolyte was obtained.

Making of Lithium-Ion Secondary Battery

The above-mentioned electrode group was accommodated in an outer package made of a bag-like aluminum laminate film. Subsequently, while thus obtained product was held under a reduced pressure in a vacuum chamber, the above-mentioned liquid electrolyte was injected into the outer package, so as to immerse the electrode group into the liquid electrolyte. After the liquid electrolyte immersion was completed, the unsealed part of the outer package was sealed still under the reduced pressure, whereby a single cell of laminate type lithium-ion secondary battery in an uncharged state was obtained. Two such single cells were connected in series so as to construct a secondary battery unit (lithium-ion secondary battery of the present invention), thus yielding a battery for evaluation.

Example 43

A single cell of laminate type lithium-ion secondary battery and a unitized battery for evaluation were obtained as in Example 42 except that $LiMn_{0.42}Ni_{0.42}Co_{0.16}O_2$ was used as the positive electrode active material.

Example 44

A single cell of laminate type lithium-ion secondary battery and a unitized battery for evaluation were obtained as in Example 42 except that $LiMn_{0.30}Ni_{0.55}Co_{0.15}O_2$ was used as the positive electrode active material.

Comparative Example 8

A single cell of laminate type lithium-ion secondary battery and a unitized battery for evaluation were obtained as in Example 42 except that lithium cobalt oxide ($LiCoO_2$) was used as the positive electrode active material.

Characteristic Evaluation 6

The capacity keeping ratio of the single cell of lithium-ion secondary battery in an uncharged state obtained by Example 42 was evaluated by a cycle test with a charging upper limit voltage of 2.7 V and a discharging lower limit voltage of 1.5 V. The number of cycles was 10, whereas temperature during the test was 23° C. As a result, a capacity keeping ratio of 99.8% was obtained.

Also, the unitized battery for evaluation obtained by Example 42 was subjected to a cycle test of 100 cycles with a charging upper limit voltage of 5.4 V and a discharging lower limit voltage of 3.0 V, so as to evaluate its capacity keeping ratio. The temperature during the cycle test was 23° C. As a result, a capacity keeping ratio of 98.0% was obtained.

Further, in the manner mentioned above, the capacity keeping ratios of the single cell and battery for evaluation obtained by Example 43 were evaluated. As a result, the single cell of Example 43 exhibited a capacity keeping ratio of 99.8% after a test of 10 cycles, whereas the battery for evaluation exhibited a capacity keeping ratio of 97.8% after a test of 100 cycles.

Furthermore, in the manner mentioned above, the capacity keeping ratios of the single cell and battery for evaluation obtained by Example 44 were evaluated. As a result, the single cell of Example 44 exhibited a capacity keeping ratio of 99.7% after a test of 10 cycles, whereas the battery for evaluation exhibited a capacity keeping ratio of 98.0% after a test of 100 cycles.

These results verify that the laminate type lithium-ion secondary batteries obtained by Examples 42 to 44, either in the form of single cell or connected in series as a unitized battery for evaluation, exhibit favorable capacity keeping ratios.

Also, in the manner mentioned above, characteristics of the single cell and battery for evaluation obtained by Comparative Example 8 were evaluated. As a result, the single cell of Comparative Example 8 exhibited a capacity keeping ratio of 99.5% after a test of 10 cycles, whereas the battery for evaluation exhibited a capacity keeping ratio of 63.5% after a test of 100 cycles.

These results verify that, although the laminate type lithium-ion secondary battery obtained by Comparative Example 8 exhibits the capacity keeping ratio on a par with those of Examples 42 to 44 as a single cell, the capacity keeping ratio decreases remarkably in a unit formed by such cells connected in series.

Table 11 shows the results of these cycle tests.

TABLE 11

| | Capacity keeping ratio (%) | |
| --- | --- | --- |
| Sample | Single cell at 10 cycles | Battery for evaluation (2 single cells connected in series) at 100 cycles |
| Ex. 42 | 99.8 | 98.0 |
| Ex. 43 | 99.8 | 97.8 |
| Ex. 44 | 99.7 | 98.0 |
| Comp. Ex. 8 | 99.5 | 63.5 |

Also, these show that the capacity keeping ratio of the battery for evaluation after a test of 100 cycles is on a par with that of the single cell and favorable in each of Examples 42 to 44 using lithium titanate as the negative electrode active material and an LiMnNiCo complex oxide having a predetermined composition ratio as the positive electrode active material.

By contrast, it is verified that the cycle characteristic of the battery for evaluation tends to decrease to an unpractical degree in Comparative Example 8 using lithium cobalt oxide as the positive electrode active material.

Thus, it is verified that the lithium-ion secondary battery of the present invention has a favorable cycle characteristic even when used at a high voltage while being connected in series. This seems to show that characteristics of the lithium-ion secondary battery in accordance with the present invention are stable for a long period of time throughout charging/discharging cycles, thereby suggesting the safety of the lithium-ion secondary battery.

Industrial Applicability

As explained in the foregoing, the electrode active material, method of making the same, electrode, lithium-ion secondary battery, and method of making the same in accordance with the present invention can keep a high capacity of a lithium-ion secondary battery and fully reduce the decrease in capacity thereof after being stored at a high temperature. A lithium-ion secondary battery exhibiting a superior capacity restoring characteristic after high-temperature storage as compared with that conventionally available can be provided. In other words, a lithium-ion secondary battery yielding less characteristic deterioration in a high-temperature environment, keeping a high capacity, and exhibiting a very small swelling at the time of high-temperature storage can be provided. Further, lithium-ion secondary batteries connected in series into a unit for high-voltage use can also exhibit a high discharge capacity and an excellent cycle characteristic.

The invention claimed is:

1. A method of making a lithium-ion secondary battery, the method comprising:

charging an uncharged lithium-ion secondary battery comprising a positive electrode including an electrode active material containing Li, Mn, Ni, Co, and O atoms and having a halite type crystal structure and a negative electrode disposed so as to oppose the positive electrode, such that the lithium-ion secondary battery attains a capacity of at least substantially 50% of a full-charge capacity determined beforehand for the lithium-ion secondary battery; and annealing the charged lithium-ion secondary battery at a temperature of 80° C. to 90° C. for at least 4 hours and not more than 24 hours.

2. The method of making a lithium-ion secondary battery according to claim 1, wherein the electrode active material of the positive electrode is a metal oxide expressed by: $Li_xMn_yNi_zCo_{1-y-z}O_w$, where:

$0 \leq x \leq 1$;
$0 \leq y \leq 0.6$;
$0 \leq z \leq 1.0$;
$0 \leq y+z \leq 1$; and
$1 \leq w \leq 2$.

* * * * *